United States Patent [19]
Saito et al.

[11] Patent Number: 6,123,642
[45] Date of Patent: Sep. 26, 2000

[54] SPEED CHANGE CONTROL APPARATUS FOR ENGINE

[75] Inventors: Takeshi Saito, Mitaka; Motoyuki Hayashida, Okayama; Masayuki Hayashida, Okayama; Atsushi Hayashida, Okayama, all of Japan

[73] Assignee: MT Cars Company, Okayama, Japan

[21] Appl. No.: 09/225,707

[22] Filed: Jan. 6, 1999

[30] Foreign Application Priority Data

Jan. 8, 1998 [JP] Japan .................................. 10-001968
Jan. 21, 1998 [JP] Japan .................................. 10-009694

[51] Int. Cl.⁷ .................................................... F16H 3/02
[52] U.S. Cl. ................................................................. 477/3
[58] Field of Search ..................................... 477/109, 3, 2

[56] References Cited

U.S. PATENT DOCUMENTS

| | | | |
|---|---|---|---|
| 4,226,141 | 10/1980 | Espenschied | 477/109 |
| 4,493,228 | 1/1985 | Vukovich et al. | 477/109 |
| 4,593,580 | 6/1986 | Schulze | 477/109 |
| 4,677,880 | 7/1987 | Hattori et al. | 477/109 |
| 5,830,104 | 11/1998 | Desautels et al. | 477/109 |

FOREIGN PATENT DOCUMENTS

| | | |
|---|---|---|
| 5-59973 | 3/1993 | Japan . |
| 7-170610 | 7/1995 | Japan . |
| 7-277009 | 10/1995 | Japan . |
| 7-277014 | 10/1995 | Japan . |
| 7-304343 | 11/1995 | Japan . |
| 8-266012 | 10/1996 | Japan . |
| 10-35301 | 2/1998 | Japan . |

*Primary Examiner*—Dirk Wright
*Attorney, Agent, or Firm*—Finnegan, Henderson, Farabow, Garrett & Dunner, L.L.P.

[57] ABSTRACT

The present invention relates to a speed change control apparatus for controlling the speed change of an engine without using a clutch. In this apparatus, a mechanical transmission comprising a plurality of gears and having a neutral position provided between a main motor for running and a driving wheel. Speed change of the engine is performed as follows. First, the rotation speeds of the driving wheel (namely, the drive shaft) and the main motor are detected. Then, the main motor is operated without load. When the motor starts an no-load operation, the gears of a transmission are disengaged. Thus, the transmission is shifted to the neutral position. Subsequently, the rotation speed of the main motor is controlled so that the gears are engaged when both the rotation speeds of the wheel and the motor are nearly synchronized with each other.

19 Claims, 16 Drawing Sheets

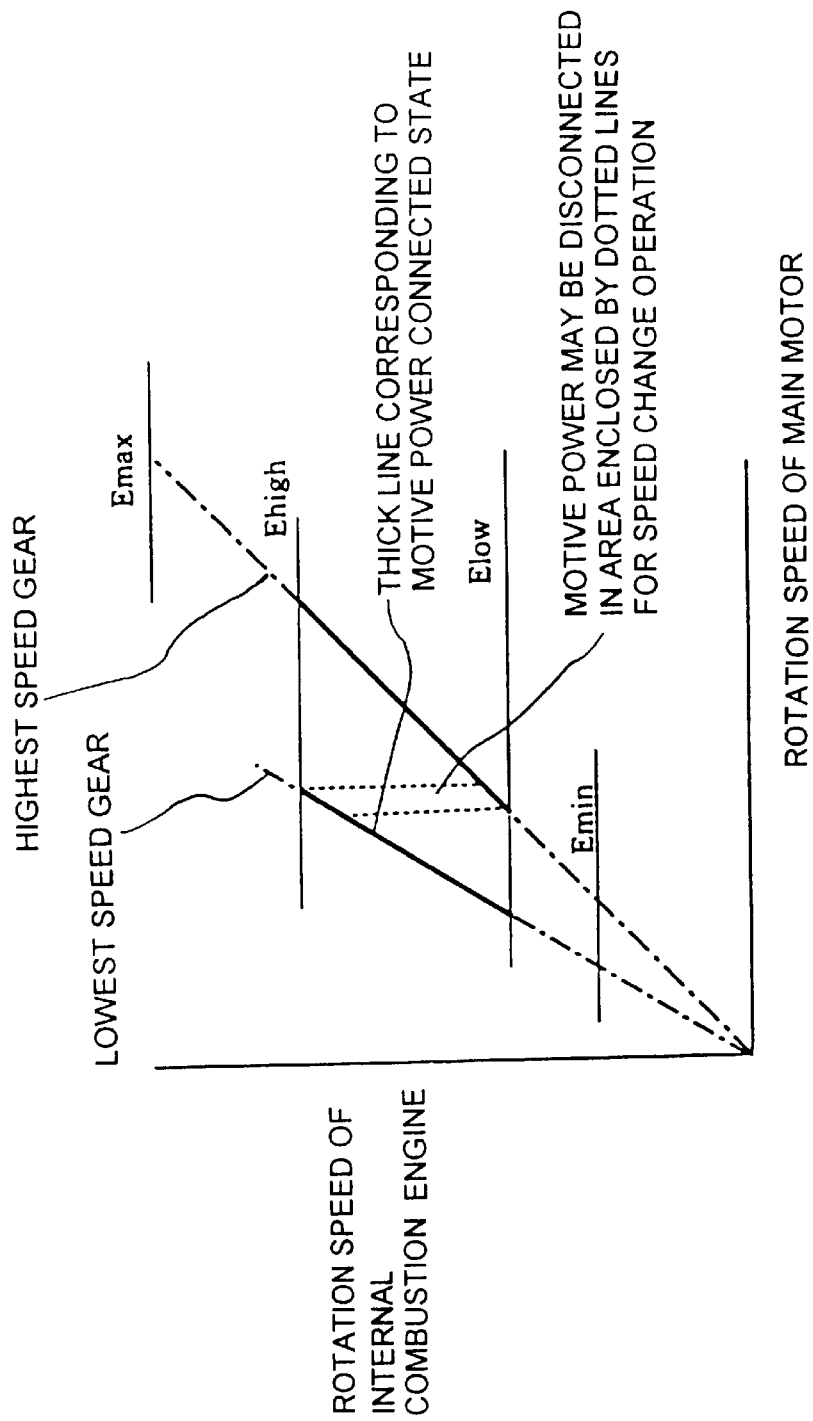

FIG.12

RELATION BETWEEN STEPPING-ON AMOUNT
OF ACCELERATOR AND ROTATION SPEED AREA TO BE USED

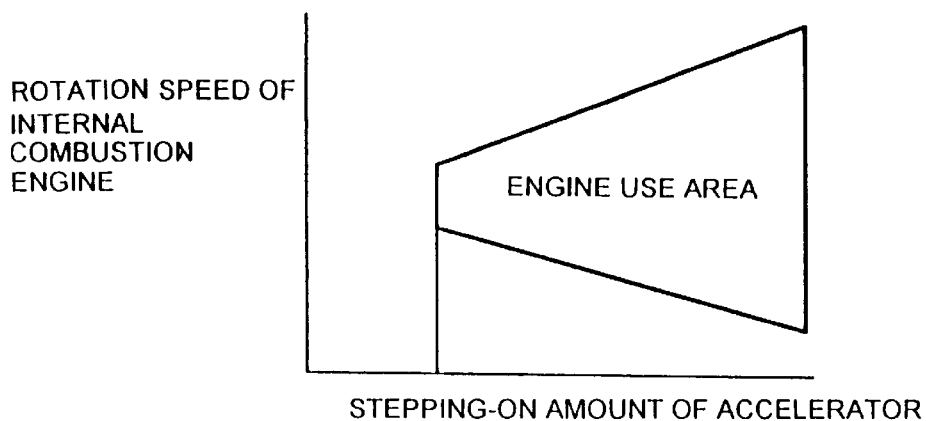

ROTATION SPEED OF
INTERNAL
COMBUSTION
ENGINE

ENGINE USE AREA

STEPPING-ON AMOUNT OF ACCELERATOR

FIG.13

RELATION BETWEEN STEPPING-ON AMOUNT OF
ACCELERATOR AND GENERATED TORQUE AREA TO BE USED

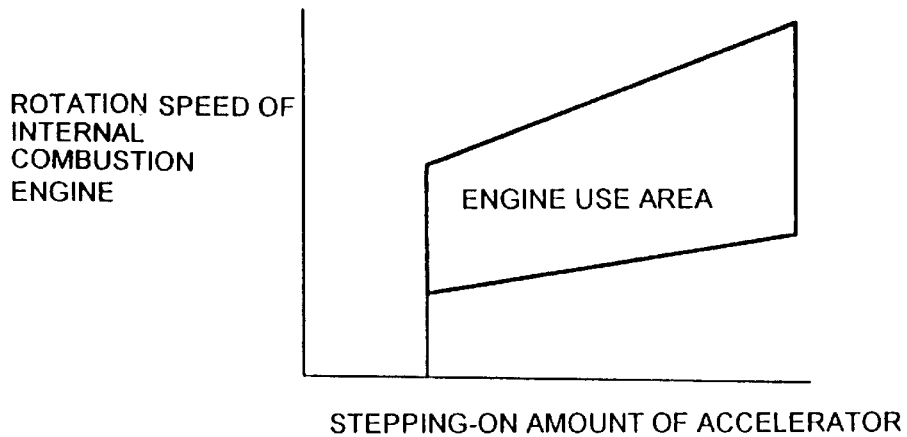

ROTATION SPEED OF
INTERNAL
COMBUSTION
ENGINE

ENGINE USE AREA

STEPPING-ON AMOUNT OF ACCELERATOR

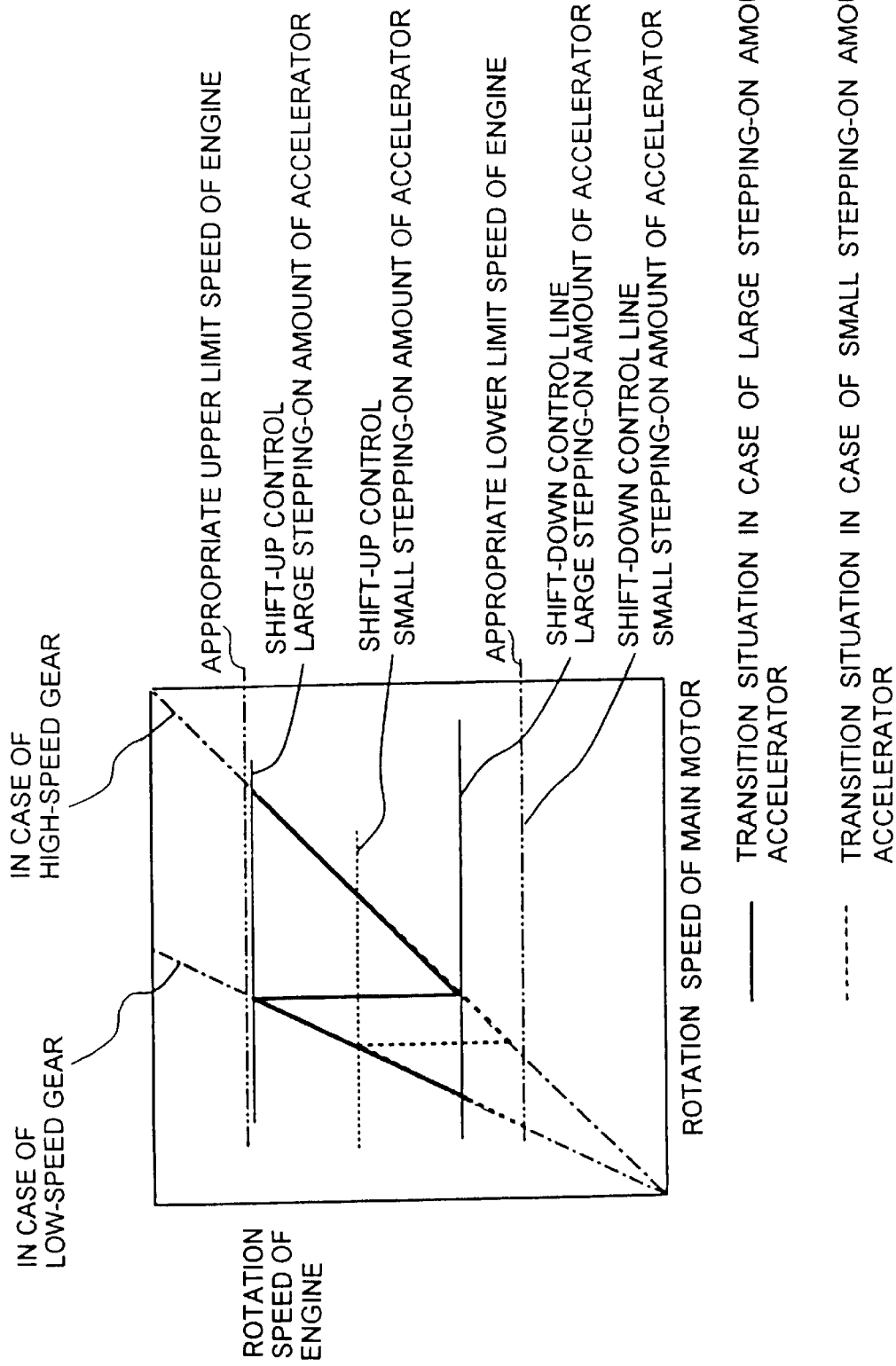

SPEED CHANGE CONTROL APPARATUS FOR ENGINE

BACKGROUND OF THE INVENTION

1. Field of the Invention

The present invention generally relates to a speed change control apparatus for an engine. More particularly, the present invention relates to techniques for achieving a speed change, during an output shaft of a transmission rotates at a predetermined speed, without using a clutch or the like.

2. Description of the Related Art

Heretofore, various kinds of systems, for example, a system having a clutch provided between an internal combustion engine and a motor for running, and a system having a transmission provided between an internal combustion engine and a motor for running or between a motor for running and a drive wheel, have been proposed as composite engine systems for a vehicle, which are adapted to run depending upon motive power provided by a motor for running (a main motor) as much as possible when waiting for a traffic signal light to change or during moving slowly and adapted to run depending upon motive power provided by a heat engine such as an internal combustion engine when being accelerated or during moving at somewhat high speed, so that both ultimate energy-saving effects and realizing low-pollution vehicles can be realized at the same time (see, for instance, Japanese Unexamined Patent Publication (Kokai) Nos. 5-59973, 7-170610, 8-266012, 7-277009, 7-277014 and 7-304343).

Further, Japanese Patent Application No. 8-196557 discloses another system similar to the aforementioned systems in concept. It has been known that the system disclosed in this Japanese Patent Application has special effects by being configured in such a manner as to comprise a second transmission as described above. Incidentally, the term "transmission" referred to herein does not designate a reduction gear adapted to realize a fixed speed change ratio, but means a mechanism capable of realizing at least two speed ratios.

Meanwhile, theoretically, such conventional engines and control systems having clutches and transmissions are considered as ultimate systems. However, when put to practical use, such conventional engines and control systems have the following drawbacks:

First, in consideration of the size of the transmission, a limit is imposed on the transmission capacity thereof. Especially, it is difficult to apply a continuously variable transmission to a truck.

Second, the continuously variable transmission is more efficient than a torque converter. However, the transmission efficiency of the continuously variable transmission is less than that of a gearbox.

Third, in view of the rather high transmission capacity of the transmission, a strong control section is needed.

Fourth, it is difficult to realize a low-cost and high-capacity system while ensuring the reliability and durability thereof.

On the other hand, in a somewhat high speed running area where a driving force depends upon an output of the internal combustion engine, the frequency of repetition of acceleration and deceleration is low, differently from the case of running in a city where the repetition of acceleration and deceleration is frequently performed. It is, thus, observed that the speed of actual traffic is nearly constant in such an area. Further, the conventional system is equipped with a continuously variable transmission for the purpose of ensuring a driving force in a very low speed running area. Such a purpose has been relatively easily accomplished by providing a simple transmission between the motor and the wheel.

It is very desirable for realizing a low-pollution internal combustion engine and energy-saving that the operating speed of the internal combustion engine is maintained at a constant value independent of a change in vehicle speed, as previously proposed. To achieve this, the system should be necessarily provided with a continuously variable transmission. This continuously variable transmission is a composing element having an advantage in continuously changing a rotation speed but is a mechanism including a large stress therein. If the aforementioned condition is moderated by replacing the term "at a constant value" with the expression "within a certain range", the system may employ a mechanical transmission that uses ordinary gears.

This system retrogresses from the conventional system that features the ability to operate the internal combustion engine at exactly constant speed and torque. However, if the internal combustion engine is permitted to change the operating speed thereof within a certain range according to a vehicle speed, a system capable of achieving effects similar to those obtained by the functions of the conventional system can be realized by providing a mechanical transmission therein.

Incidentally, in a method of operating the engine, attention should be paid to the following points in a low-speed running area, during acceleration, and in medium-speed and high-speed cruising areas, as compared with a method of operating the conventional composite engine system constituted by using a continuously variable transmission.

1. In a low-speed running area, an operation of the internal combustion engine should be stopped. Alternatively, the system should be adapted to function as a serial hybrid one.

Namely, in the low-speed running area, there is a large difference between the power provided in an essentially desirable operating region of the internal combustion engine and the power needed by a motor vehicle (namely, excessive power of the internal combustion engine). During a cooperative operation of the internal combustion engine and the motor, this motor functions as a large generator at all times. Especially, during deceleration, the kinetic energy of the vehicle body is regenerated. It is, thus, difficult to efficiently store such a large current. Moreover, in this area, vehicles frequently repeat short-time acceleration and deceleration. Thus, operations of controlling the engine system are complicated and troublesome. Furthermore, there is a fear that the durability of the system is impaired. Particularly, regarding the problem of torque during deceleration, when the rotation speed at an axle position is reduced by the continuously variable transmission in accordance with the vehicle speed while performing the constant operation of the internal combustion engine at a constant output, a large driving force is produced at the axle despite an intention of deceleration. Th is results in emergence of a situation where the motor overworks on a braking operation in the low-speed running area in which the electric-power generating ability thereof drops off and where the system is under stress. It is advisable that the generation of motive power for running is left to the motor and that the internal combustion engine is caused to stop or to devotedly generate electric power within a relatively small output range.

With such a novel idea, the internal combustion engine is separated from the generation of motive power in the low-speed running area where the speed change of the vehicle frequently occurs. Moreover, the necessity of the continuously variable transmission is reduced. Furthermore, the possibility of employment of the mechanical transmission is increased.

2. During acceleration, the driving force allotted share depending upon the internal combustion engine i s somewhat shifted to the driving force allotted share depending upon the motor.

Namely, in the case of the vehicle having the conventional system, an accelerating force is short if only the driving force generated by the motor is used in the low-speed running area. Thus, such a conventional vehicle is inferior to the current motor vehicle in performance. Consequently, such a conventional vehicle employs a method of first reducing the driving force of the internal combustion engine by a continuously variable transmission or the like, and subsequently obtaining a large driving force in the low-speed running area and further superimposing the obtained driving force upon a driving force generated by the motor and then transmitting the super imposed driving forces to a drive shaft. However, in environments where mechanical transmissions are employed instead of continuously variable transmissions, a steep change in the engine rotation speed of the internal combustion engine in a very short time is liable to frequently take place in the low-speed running area. As described above, outputs of the internal combustion engine are not available during acceleration if the rotation of the internal combustion engine is disconnected from or is indirectly connected to the drive shaft. Thus, the conventional system should take another means for supplementing an accelerating force. It is, therefore, considered that a mechanism, which has a transmission provided between the motor and the axle and is operative to increase the torque generated by the motor during acceleration or up-hill climbing and to then transmit the torque to the axle, is suitable for such a means. Namely, the concept, in which, by reducing the rotation speed, the rotating force of the internal combustion engine is increased to be utilized, in the situation where a large driving force is necessary, for example, on acceleration, is applied to a case where the torque generated by the motor is utilized by being increased, during acceleration accompanying vehicle speed change, while using outputs of the internal combustion engine when a large driving force of a constant speed is necessary, for instance, during up-hill climbing.

3. In the medium-speed and high-speed cruising areas, the driving force allotted share depending upon the internal combustion engine is increased.

Namely, vehicles of the conventional structure have a problem in that such vehicles are not in the environment where outputs of the internal combustion engine are efficiently utilized in the medium-speed and low-speed running areas. However, the internal combustion engine often achieves the performance thereof most satisfactorily in the medium-speed and high-speed cruising areas, especially, in the high-speed cruising area. It is known from experience that the more needless operations are performed in the high-speed cruising area, the more energy-saving effects are lost. In this high-speed cruising area, it is very improper to use what is called a serial hybrid vehicle adapted to run by first generating electric power by use of the rotating force of the internal combustion engine and then converting the generated power into the rotating force by the motor. The use of the serial hybrid vehicle in the high-speed cruising area results in exhaustion of the gain obtained in the low-speed running area. In the high-speed running area, it is very important to transmit outputs of the internal comsbution engine to the axle as directly as possible. Comprehensive effects are easily obtained by limiting the functions of the motor to auxiliary ones such as the assistance during acceleration and the regeneration of power during deceleration.

Namely, it is more desirable for saving energy and preventing pollution that a tendency to use the motor as a main engine is strengthened under ordinary running conditions and that the degree of dependence of motive power upon outputs of the internal combustion engine is increased in a highway driving mode.

It is conjectured that a system being close or equivalent to the system having a continuously variable transmission may be realized by transmitting the rotating force of the internal combustion engine to the wheels without energy conversion and increasing the degree of dependence of motive power upon the motor in the low-speed running area while maintaining high efficient running in a high-speed cruising mode. A very compact well-organized composite engine system may be manufactured at low cost by employing a mechanical transmission. Moreover, a transmission for use in a large truck may be manufactured according to accumulated conventional technical knowledge by employing field-proven gears. This enables the application of the composite engine system to all motor vehicles.

Attention should be paid to these respects similarly as in the conventional case. However, in the case of the composite engine system employing a mechanical transmission, the aforementioned respects should be slightly emphasized, as compared with the composite engine system constituted by using a continuously variable transmission.

The present invention is accomplished in view of the problems of the conventional systems. Accordingly, an object of the present invention is to provide a speed change control apparatus for an engine system that employs a mechanical transmission using ordinary gears.

SUMMARY OF THE INVENTION

To achieve the foregoing object, in a first aspect of the present invention, there is provided a speed change control apparatus for an engine, which comprises an engine for generating a driving force, a mechanical transmission, which has an input shaft connected to the engine, for receiving a driving force and transmitting the driving force through gears to an output shaft thereof rotating at a predetermined rotation speed, a rotation speed detecting device for detecting the rotation speed of the output shaft of the transmission, an engine control device for controlling the engine so that the driving force of the engine is zero when the transmission is shifted to a neutral position by disengaging the gears at a time of speed change, and for controlling the engine so that the detected rotation speed of the output shaft is synchronized with the rotation speed of the input shaft when the gears are engaged in the neutral position of the transmission, and a speed change control device for controlling the transmission in such a manner as to shift the transmission to the neutral position by disengaging the gears when the driving force of the engine is zero, and for controlling the transmission in such a way as to engage the gears when the rotation speed of the input shaft is nearly synchronized with the rotation speed of the output shaft.

With such a constitution, at a time of speed change, the engine is controlled by the engine control device so that the driving force of the engine is zero. Further, the gears are disengaged by the speed change control device, with the result that the transmission is shifted to the neutral position. The rotation speeds of the output and input shafts of the transmission are detected by the first and second rotation speed detecting devices, respectively. The engine is controlled by the engine control device based on the detected rotation speeds of the output and input shafts of the transmission so that the rotation speed of the input shaft of the transmission is synchronized with the rotation speed of the output shaft of the transmission. When the rotation speed of the input shaft of the transmission is nearly synchronized with that of the output shaft, the speed change control device engages the gears of the transmission.

Further, the speed of the engine can changed by using the mechanical transmission without using a clutch or the like. Thus, a downsized space-saving system is realized. Moreover, the transmission capacity of the transmission is not limited at all. Furthermore, the mechanical transmission has a good transmission efficiency. Consequently, even a high-capacity system can be realized at a low cost while ensuring the reliability and durability thereof.

In a second aspect of the present invention, there is provided a speed change control apparatus wherein the aforementioned transmission sets a first speed change ratio based on the highest rotation speed of the output shaft and the highest rotation speed of the engine connected to the input shaft, and in changing the speed change ratio from an nth ($n \geq 1$) speed change ratio to an (n+1)th speed change ratio when the optimum rotation speed of the engine at the nth speed change ratio has a lowest value, the (n+1)th speed change ratio is serially set so that the engine is driven within a range of the optimum rotation speeds.

With such a constitution, the first speed change ratio of the transmission is set based on the highest rotation speed of the output shaft and the highest rotation speed of the engine connected to the input shaft. Further, for example, in changing the speed change ratio from the first speed change ratio to the second speed change ratio when the optimum rotation speed of the engine at the first speed change ratio has the lowest value, the second speed change ratio is set so that the engine is driven within a range of the optimum rotation speeds. Thus, the remaining higher-order speed change ratios are set in sequence in a similar manner.

Consequently, the engine can be operated in the desirable operating region thereof.

In a third aspect of the present invention, there is provided a speed change control apparatus wherein the aforesaid speed change control device engages the aforesaid gears of the aforementioned transmission when the difference between the circumferential speeds of an output shaft side gear and an input shaft side gear to be engaged is within a predetermined range.

With such a constitution, the gears are engaged when the difference between the circumferential speeds of the output shaft side gear and an input shaft side gear to be engaged is within the predetermined range.

Consequently, a gear change can be smoothly achieved.

In a fourth aspect of the present invention, there is provided a speed change control apparatus wherein the engine and the transmission are applied to a motor vehicle, and the apparatus further comprises a stepping-on amount detecting device for detecting a stepping-on amount of an accelerator pedal, and the aforesaid speed change control device controls the transmission according to the detected rotation speed of the engine and the detected stepping-on amount of the accelerator pedal in such a way as to shift the transmission to the neutral position where the gears are engaged or disengaged.

With such a constitution, the stepping-on amount of the accelerator pedal is detected by the stepping-amount detecting device as exemplifying a load when the vehicle is travelling. The transmission is shifted to the neutral position, where the gears are engaged or disengaged, according to the detected rotation speed of the main motor and the stepping-on amount of the accelerator pedal. Therefore, a speed change control operation is performed according to the operating conditions of the vehicle. Consequently, the vehicle can be operated under the optimum conditions.

In a fifth aspect of the present invention, there is provided a speed change control apparatus wherein a speed change ratio of said transmission is selected based on the detected rotation speed of the main motor and the stepping-on amount of the accelerator pedal.

With such a constitution, the speed change ratio of the aforesaid transmission is selected based on the detected rotation speed of the main motor and the stepping-on amount of the accelerator pedal. Consequently, the optimum speed change ratio can be selected.

In a sixth aspect of the present invention, there is provided a speed change control apparatus wherein the aforesaid transmission is provided between the engine and a drive shaft, and the output shaft of the transmission is the drive shaft of the driving wheel.

With such a constitution, the aforementioned speed change control can be applied to the transmission provided between the engine and the drive shaft.

In a seventh aspect of the present invention, there is provided a speed change control apparatus wherein the aforesaid engine comprises a main motor for running, and an auxiliary engine for supplementing a driving force of the main motor, and the aforesaid transmission is provided between the main motor and the auxiliary engine, and the motor control device controls the auxiliary engine.

With such a constitution, such a speed change control can be applied to the mechanical transmission provided between the main motor and the auxiliary engine.

In an eighth aspect of the present invention, there is provided a speed change control apparatus wherein a rotation shaft of the aforesaid auxiliary engine is placed coaxially with a rotation shaft of the aforesaid main motor, and the transmission comprises a gear connected to the rotation shaft of the auxiliary engine, a gear connected to the rotation shaft of the main motor and a gear meshing with both of these gears, and one of these gears is an output gear.

With such a constitution, the driving force is output from one of the gear connected to the rotation shaft of the auxiliary engine, the gear connected to the rotation shaft of the main motor and the gear meshing with both of these gears.

Further, in such a manner, the cost of the apparatus can be reduced by decreasing the number of used gears. Moreover, the number of speeds can be increased.

In a ninth aspect of the present invention, there is provided a speed change control apparatus wherein the engine comprises a main motor for running and an auxiliary engine for supplementing a driving force of the main motor, and a first transmission is provided between the auxiliary engine and the main motor, and a second transmission is provided between the main motor and the drive shaft, and the engine control device is adapted to control the main motor and the auxiliary engine, and further the speed change control device is adapted to control the first and second transmissions.

With such a constitution, the first and second transmissions are provided between the main motor for running and the auxiliary engine and between the drive shaft and the main motor, respectively, and the aforementioned speed change control is applied to such transmissions, thereby achieving the optimum speed change control operations on the main motor and the auxiliary engine.

In a tenth aspect of the present invention, there is provided a speed change control apparatus wherein at least one of the aforesaid first and second transmissions comprises a speed-changeable epicyclic gear and a clutch that is adapted to transmit a driving force by engaging two gears.

With such a constitution, the speed of the engine is changed by the epicyclic gear. As a result of using the epicyclic gear, a compact transmission can be realized.

In an eleventh aspect of the present invention, there is provided a speed change control apparatus wherein a rotation shaft of the aforesaid main motor is placed coaxially with a rotation shaft of the aforesaid auxiliary engine, and the first transmission has a countershaft provided in parallel with the rotation shafts of the main motor and the auxiliary engine and the second transmission has a rotation shaft placed in parallel with the countershaft so that the first and second transmissions have the countershaft in common.

With such a constitution, the first and second transmissions have the countershaft in common. Consequently, energy loss can be reduced.

In a twelfth aspect of the present invention, there is provided a speed change control apparatus wherein the aforesaid first and second transmissions are adapted to use the countershaft as an output shaft.

With such a constitution, a driving force is output through the output shaft from the transmissions. Thus, the driving force can be efficiently output therefrom. Consequently, the durability of the transmissions is enhanced.

In a thirteenth aspect of the present invention, there is provided a speed change control apparatus wherein the aforesaid main motor is a synchronous motor, and the first rotation speed detecting device is adapted to detect a rotation speed of a magnetic field of the synchronous motor and then detect a rotation speed of the synchronous motor based on the detected rotation speed of the magnetic field.

In such a constitution, a rotor of the synchronous motor rotates in synchronization with the magnetic field. Thus, the rotation speed of the main motor can be detected by detecting the rotation speed of the magnetic field of the synchronous motor. Consequently, a device for detecting the rotation speed of the main motor is omitted.

In a fourteenth aspect of the present invention, there is provided a speed change control apparatus wherein the aforesaid main motor is an induction motor, and the first rotation speed detecting device is adapted to detect a rotation speed of a magnetic field of the induction motor after a lapse of a predetermined time period required to stabilize a rotation speed of a rotor when the induction motor is operated without load, and further adapted to detect a rotation speed of the induction motor based on the detected rotation speed of the magnetic field.

With such a constitution, even if the rotation speed of the induction motor changes, if the induction motor operates at such a rotation speed without load, the rotation speed of the rotor follows the rotation speed of the magnetic field to be stabilized after a lapse of a predetermined time period. Thus, the rotation speed of the main motor can be detected by detecting the rotation speed of the magnetic field. A vehicle speed sensor may be used in place of a rotation speed sensor for detecting the rotation speed of the main motor.

In a fifteen aspect of the present invention, there is provided a speed change control apparatus wherein the aforesaid auxiliary engine is an internal combustion engine.

In such a constitution, the internal combustion engine is controlled by the engine control device. Thus, the aforementioned speed change control can be applied to the engine system using the internal combustion engine as the auxiliary engine.

In a sixteen aspect of the present invention, there is provided a speed change control apparatus wherein the aforesaid auxiliary engine comprises an internal combustion engine and a control motor for controlling a rotation speed of the internal combustion engine.

With such a constitution, the internal combustion engine is controlled by not only the engine control device but also the control motor for the rotation speed thereof and then the speed change control thereof is performed.

Further, because the control motor also controls the rotation speed of the internal combustion engine, a more accurate speed control can be achieved. Moreover, the aforementioned speed change control thereof can be facilitated. Furthermore, the problems of exhaust-gas and fuel consumption during a speed change control operation are solved.

In a seventeenth aspect of the present invention, there is provided a speed change control apparatus wherein, when the gears of the transmission are disengaged and the transmission is shifted to the neutral position, the engine control device drives the control motor as a self-starting motor, if starting the internal combustion engine, and operates the control motor as a generator, if the internal combustion engine is operated.

With such a constitution, the control motor is used not only for speed change control but also for controlling the internal combustion engine when the transmission is shifted to the neutral position.

Therefore, when power transmission through the gears is interrupted, the control motor is used for various purposes, for example, for a self-starting motor or a generator.

In an eighteenth aspect of the present invention, there is provided a speed change control apparatus wherein, when the gears of the transmission are engaged, the engine control device causes the control motor to operate as a generator, if electric power is needed, and drives the control motor to operate as a motor, if electric power is unnecessary.

With such a constitution, the control motor is used not only for speed change control but also for various purposes, for instance, for a generator or a motor, when the gears of the transmission are engaged.

In a nineteenth aspect of the present invention, there is provided a speed change control apparatus having a lubricating oil pump that is driven by the main motor.

With such a constitution, the oil pump is driven by the main motor when the main motor rotates during the vehicle runs. Thus, lubricating oil is provided to the apparatus at all times.

Namely, in the speed change control apparatus according to the nineteenth aspect of the present invention, the main motor rotates at all times during the vehicle runs. Thus, an oil pressure is generated. Consequently, good lubricating effects can be obtained.

BRIEF DESCRIPTION OF THE DRAWINGS

FIG. 11 is a graph illustrating a speed change control operation of a third embodiment of the present invention;

FIG. 12 is a graph illustrating the relation between the stepping-on amount of an accelerator pedal and the rotation speed areas of an engine;

FIG. 13 is a graph illustrating the relation between the stepping-on amount of the accelerator pedal and the generated torque regions of the engine;

FIG. 14 is a graph illustrating a method of selecting a speed change ratio;

DETAILED DESCRIPTION OF THE PREFERRED EMBODIMENTS

Hereinafter, the preferred embodiments of the present invention will be described in detail with reference to FIGS. 2 to 20.

First, a first embodiment of the present invention will be described hereinbelow.

In this embodiment, a transmission is provided between an engine and a drive shaft. A speed ratio between the drive shaft and the engine is changed by synchronizing the rotation speed of the drive shaft with that of the engine.

The layout of a system, in which a transmission is provided between an engine and a drive shaft, is very ordinary among hitherto known layouts. This embodiment, however, aims at controlling the transmission by adjusting the speed of the engine to a synchronous speed without the aid of a clutch.

If the circumferential speeds of gears are in agreement with each other at an engaging position when trying to smoothly engage the gears, the gears engage with each other very easily and quietly, in the same as the case of engaging gears that are at a standstill.

To smoothly engage the gears, it is necessary to control the rotation speed of the engine and synchronize the rotation speed of the engine with that of the drive shaft.

Theoretically, the engine may be an internal combustion engine. Actually, a motor is preferable because of the easiness of control of the rotation speed thereof. Especially, since the control of the rotation speed of an a. c. motor is achieved with incomparably high accuracy, the a. c. motor has a merit in being unifiedly managed by a control computer. Apart from the difference between a generator and a motor, for example, it is known as a daily experience that a mains-powered electric clock having been commercially practical for a long time works very accurately so long as no power failure occurs. This is because of the fact that the rotation speed of a generator of a power plant. As is understood from the fact that a generator and a motor operate on the same principle except that the direction of energy flow in the generator is opposite to the direction of energy flow in the motor, the rotation speeds of the generator and the motor are controlled with very high precision.

Figure 1:
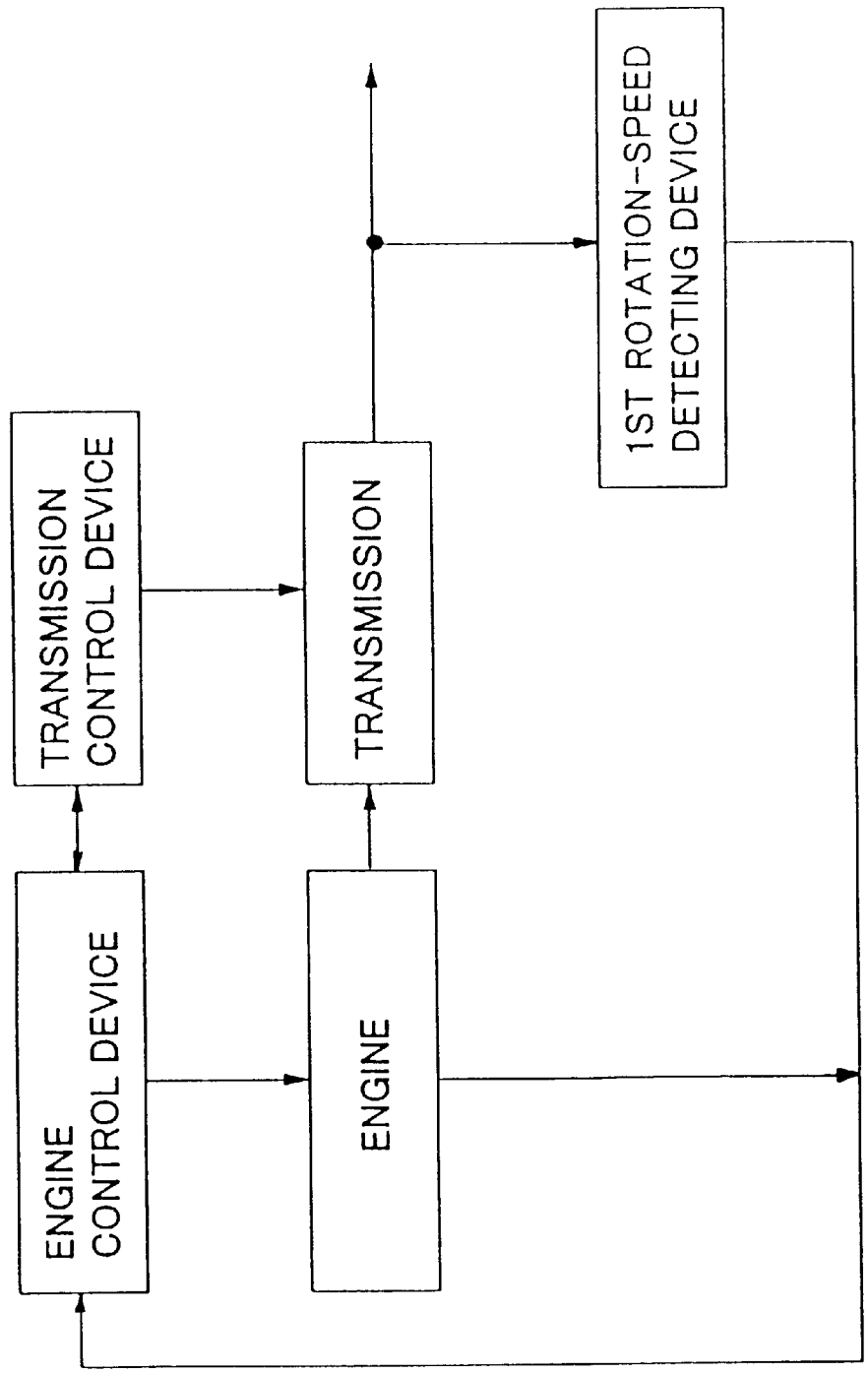
FIG. 1 is a diagram illustrating the constitution of an apparatus of the present invention described in claims.
Figure 2:
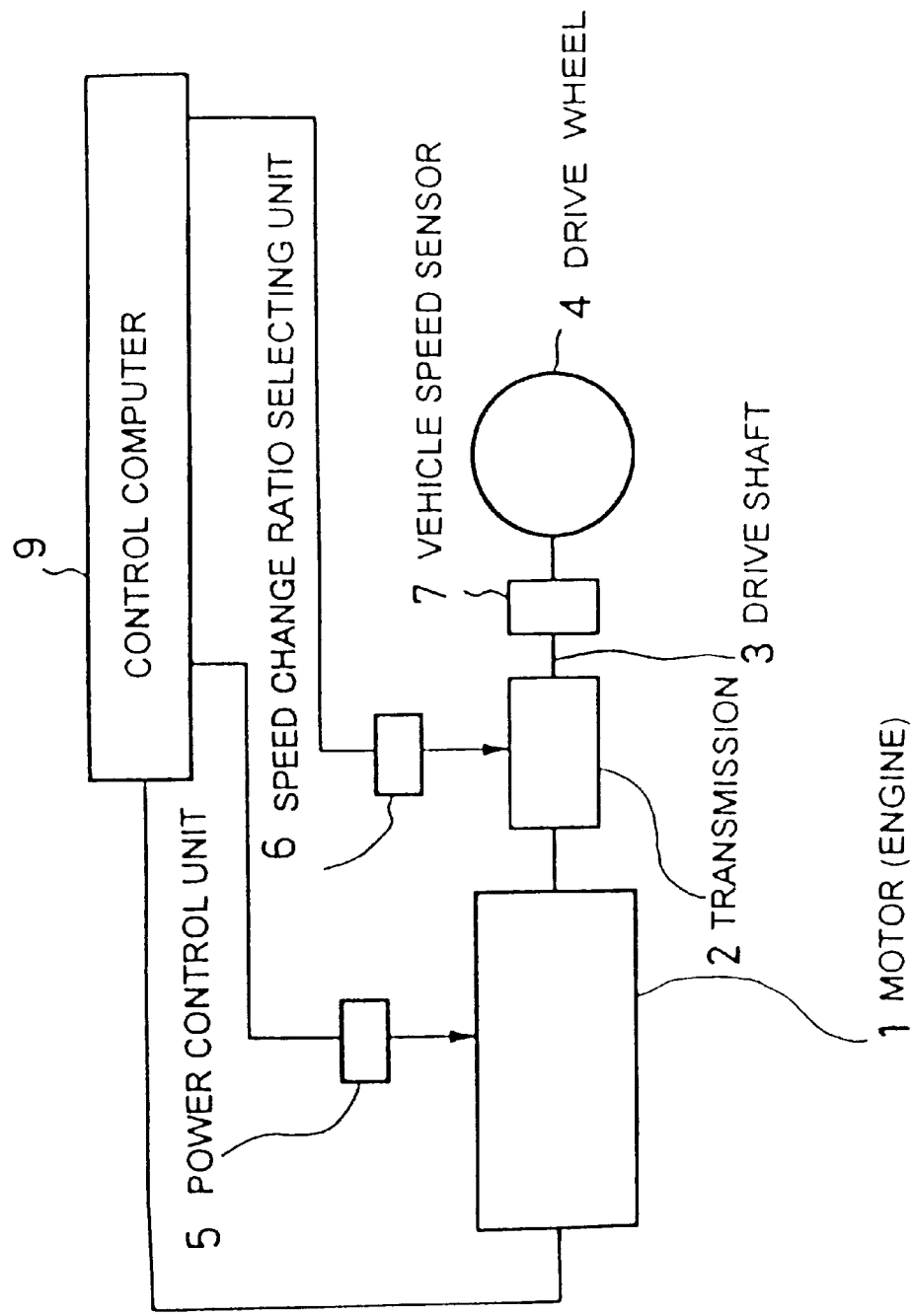
FIG. 2 is a diagram illustrating the constitution of a first embodiment of the present invention.

FIG. 2 shows the constitution of the first embodiment.

As shown in this figure, a main motor 1 is an engine which generates a driving force, and is connected to an input shaft of a transmission 2. For example, an a. c. motor having a frequency-controlled rotation speed is used as this main motor 1.

A driving wheel 4 is connected to a drive shaft 3 serving as an output shaft of the transmission 2. This transmission 2 includes a plurality of gears and has a neutral position. Further, this transmission 2 is of the mechanical type that changes the rotation speed of the main motor 1 by changing over the engagement among the gears.

A power control unit 5 supplies a. c. power to the main motor 1 and controls the frequency of the a. c. power.

A speed change ratio selecting unit 6 selects a speed change ratio by controlling this transmission 2.

The drive shaft 3 is provided with a vehicle speed sensor 7 acting as a rotation speed detecting device for detecting the rotation speed of the drive shaft 3.

A control computer 9 has CPU, ROM, RAM and various interfaces and sets a frequency, based on the rotation speeds of the main motor 1 and the drive shaft 3, which is detected by the vehicle speed sensor 7. Moreover, the control computer 9 controls the rotation speed of the main motor 1 through the power control unit 5 and also controls the speed change ratio of the transmission 2 through the speed change ratio selecting unit 6.

Figure 3:
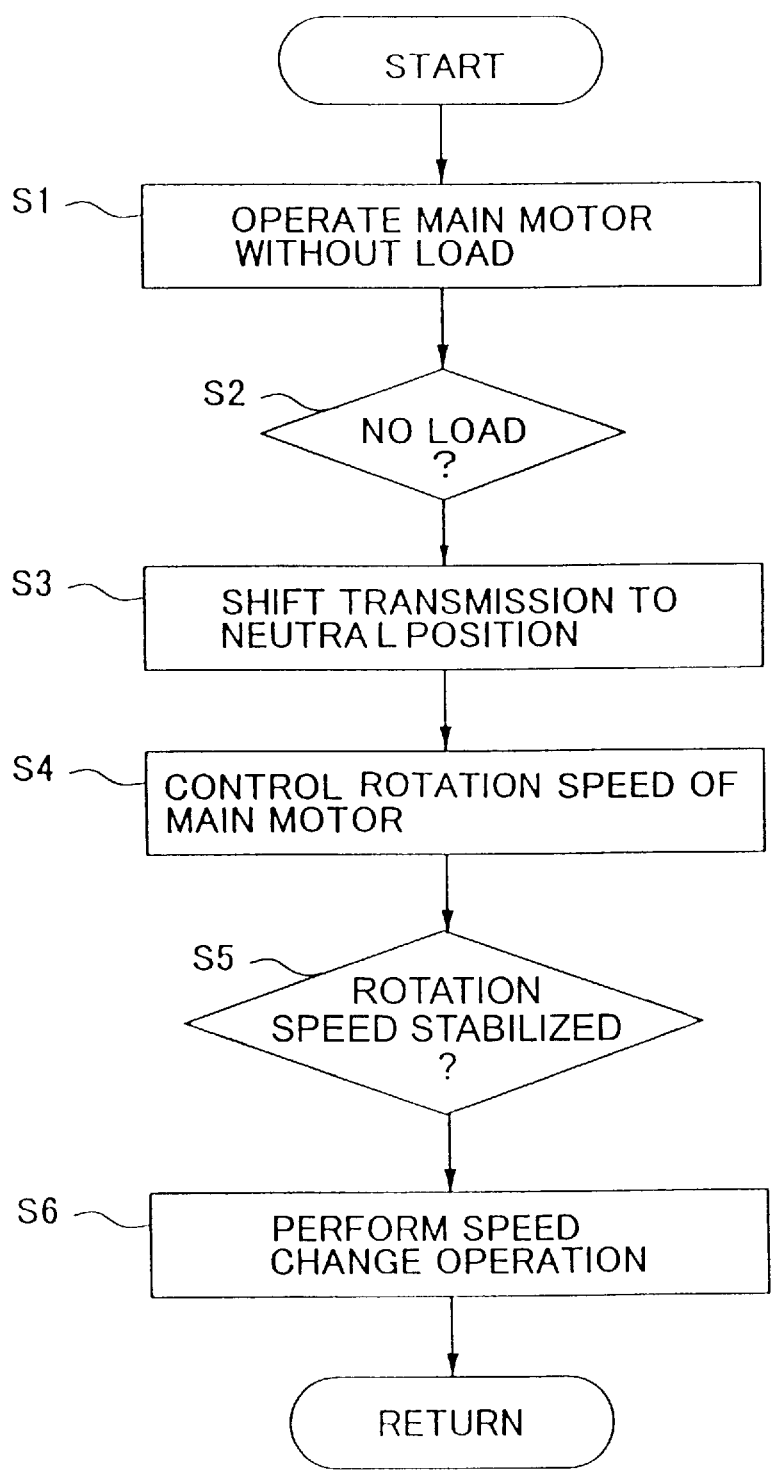
FIG. 3 is a flowchart illustrating a speed change operation of the first embodiment of FIG. 2.

Next, an operation of this embodiment will be described hereinbelow by referring to a flowchart of FIG. 3.

Figure 4:
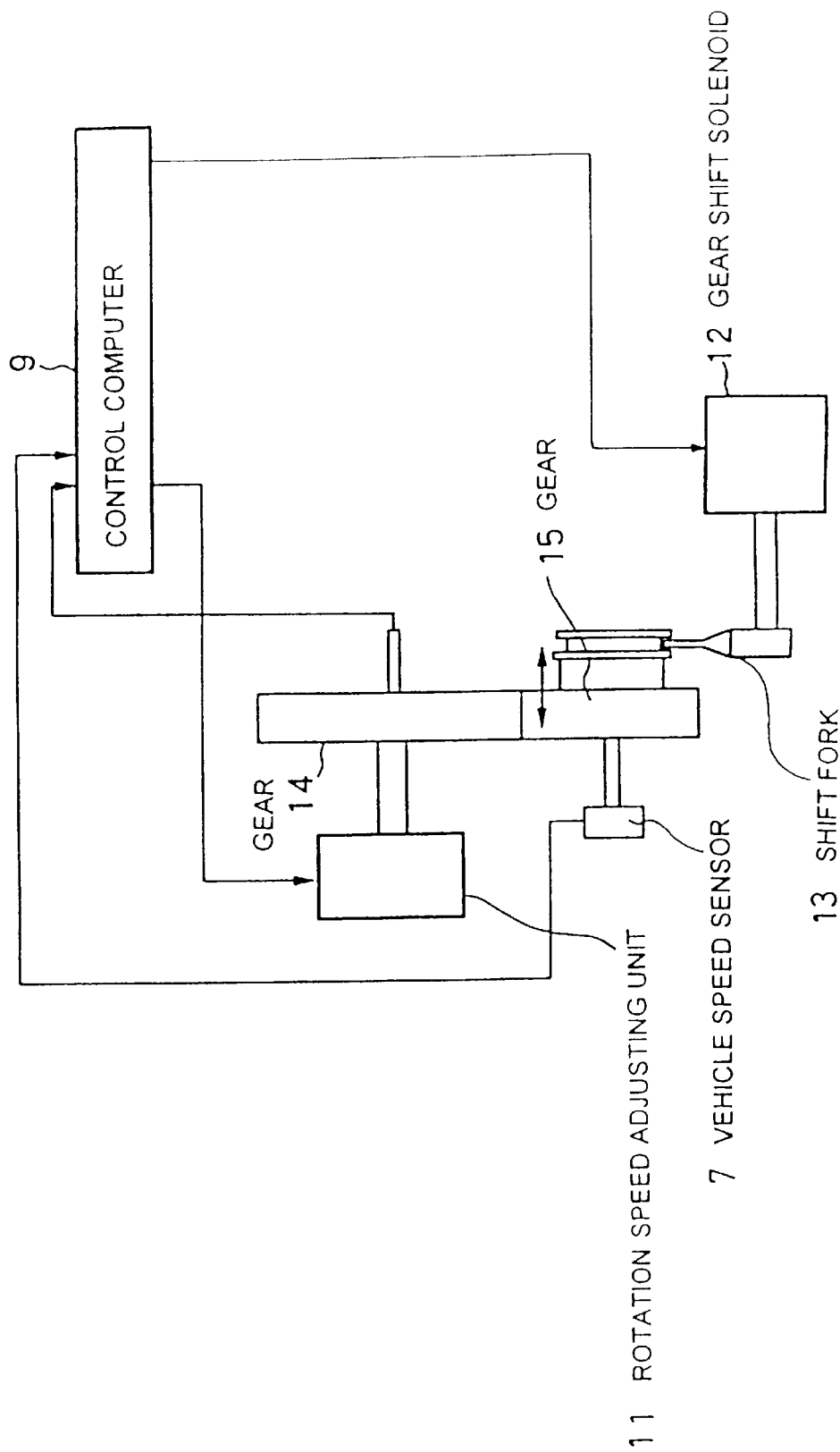
FIG. 4 is a diagram illustrating the principle of the speed change operation illustrated in FIG. 3.

Incidentally, FIG. 4 illustrates the principle on which a speed change operation is performed by the synchronous control of the gears without providing a clutch in the apparatus. A rotation speed adjusting unit 11 is equivalent to the combination of the main motor 1 and the power control unit 5. The combination of a gear shift solenoid 12 and a shift fork 13 is equivalent to the speed change ratio selecting unit 6. Further, this figure shows the constitution of an input-shaft-side portion to which the driving force is input. The driving force is transmitted to an output-shaft-side portion through a gear 15.

At step S1, the main motor 1 is caused to operate without load. To operate the main motor 1 without load, the phase difference angle thereof is set nearly at zero, for example, when a synchronous motor is employed as the main motor 1.

When the operation of the motor is changed to a no-load operation, control proceeds from step S2 to step S3, whereupon the transmission 2 is shifted to the neutral position. Consequently, a gear 14 becomes free.

At step S4, the rotation speed of the gear 14 is controlled through the rotation speed adjusting unit 11 based on the rotation speeds of the gears 15 and 14, which is detected by the vehicle speed sensor 7, in such a manner as to synchronize the circumferential speed of the gear 14 with that of the gear 15.

When it is judged at step S5 whether or not the time required to stabilized the rotation speed has elapsed, i.e., that the circumferential speed of the gear 14 is nearly synchronized with that of the gear 15, namely, the difference between the circumferential speeds of the gears 14 and 15 becomes equal to or less than a predetermined value, the shift fork is controlled by driving the gear shift solenoid 12. Thus, the gear 15 is shifted.

Incidentally, when a switching operation is performed between the interruption and the transmission of motive power, a speed change operation should be performed in principle after the circumferential speeds of the gears is made to be in agreement with each other. However, actually, the engagement between the gears is changed over when the difference between the circumferential speeds becomes 1 rpm or so. This achieves the operation of changing over the engagement between the gears more smoothly. Especially, in the case of employing a synchronous motor as the main motor 1, perfectly uniform rotation is performed. In such a case, the engagement between the gears is not completely accomplished even if only the top portions of the teeth of the gears happen to touch with one another and the gears continue the uniform rotation in such a state. Further, in the case of employing an induction motor, the control of rotation thereof is not so accurate. Shortly, the top portions of the teeth of each of the gears are spontaneously slid into clearances provided between adjacent teeth of the other gear, and the engagement between the gears is completed. However, an operation of engaging the gears is accurately and reliably achieved if the gears are intentionally controlled so that the top portions of each of the gears are slowly slid into the clearances of the other gear.

Figure 5:
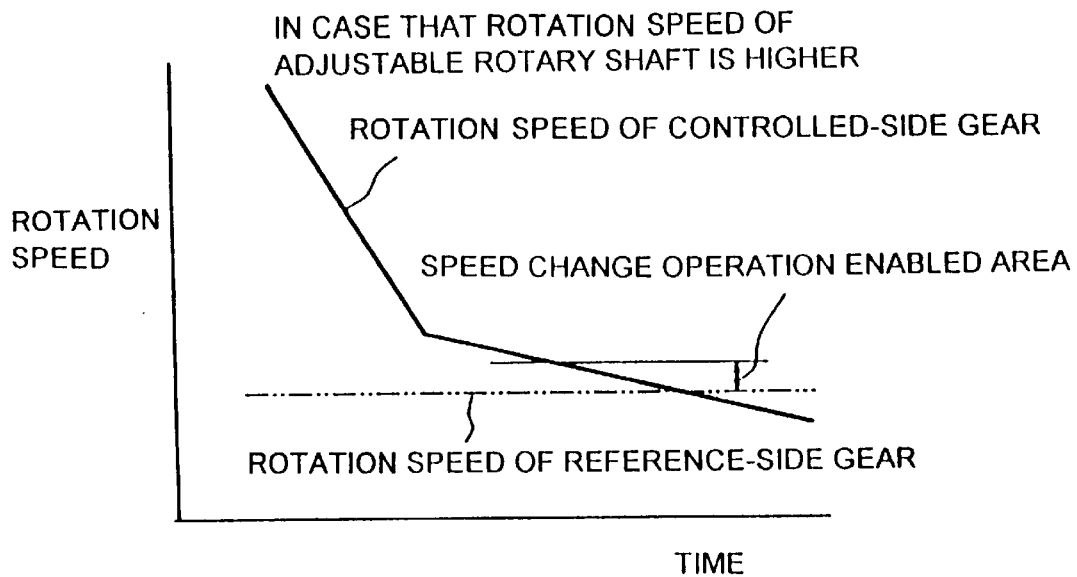
FIG. 5 is a graph illustrating the speed change operation illustrated in FIG. 3.

Furthermore, in the case that the rotation speed of a controlled-side gear (namely, the gear 14) is higher than the rotation speed of a reference-side gear (namely, the gear 15), a speed change operation enabled area is set at a side where the rotation speed is higher than a reference-side rotation speed, as shown in FIG. 5.

The rotation speed of the controlled-side gear is quickly changed outside the neighborhood of this area. Thus, the apparatus starts speedily making preparations for a speed change operation. Then, in the neighborhood of this area, the rotation speed of the controlled-side gear is gradually changed so that a speed change operation is reliably performed.

Figure 6:
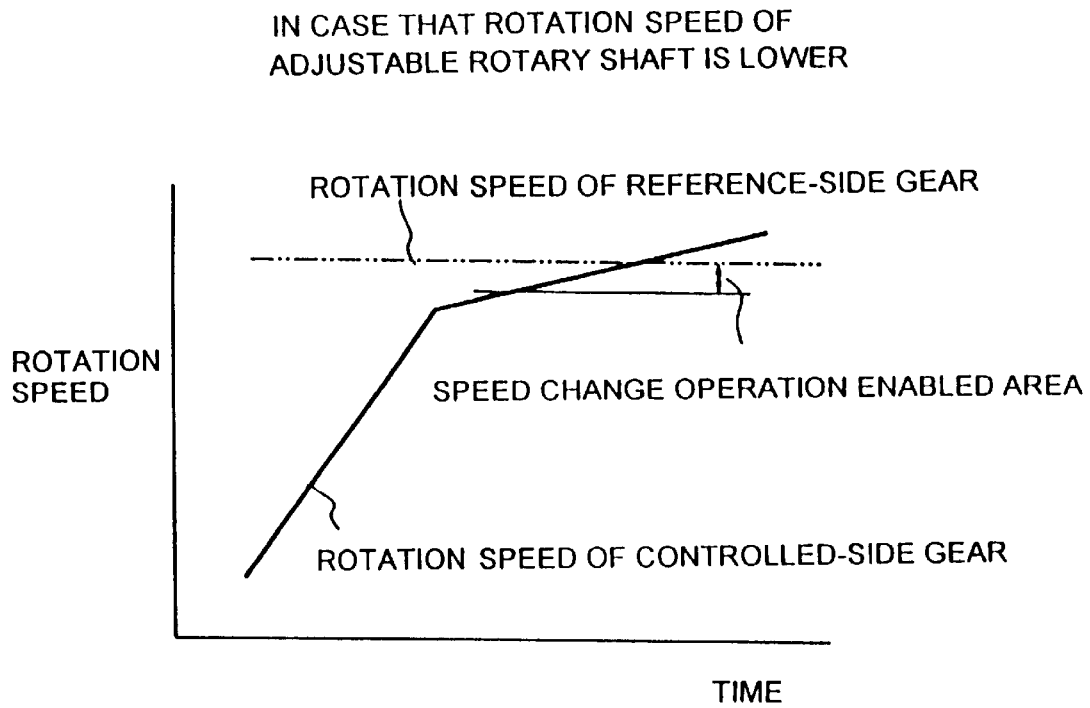
FIG. 6 is a graph illustrating the speed change operation illustrated in FIG. 3.

Conversely, in the case that the rotation speed of the control led-side gear is lower than the rotation speed of the reference-side gear, a speed-change-operation enabled area is set at a side where the rotation speed is lower than the reference-side rotation speed, as shown in FIG. 6. Similarly as in the aforementioned case, the rotation speed of the controlled-side gear is quickly changed outside the neighborhood of this area. In the neighborhood of this area, the rotation speed of the controlled-side gear is gradually changed.

Thus, this embodiment is adapted so that the speed change ratio is converged as fast as possible to a ratio at which a speed change operation is performed. This is because of a delay in an operation of the gear shift fork 12 of the speed change ratio selecting unit. Further, this is the indispensable technique for automatically performing a speed change operation of a mechanical transmission having gears.

Moreover, the control computer 9 automatically performs a sequence of steps. In the case that a hydraulic operation is performed, time required to provide hydraulic oil is necessary, though such time is short. Furthermore, time taken to operate the shift fork 13 is needed, though such time is very short. When a speed change operation is performed after the rotation speed of the controlled-side gear exceeds the synchronous speed, a very strong force is needed because the rotation speed thereof is liable to deviate even more from the synchronous speed. Thus, ill effects are exerted upon the gears.

Further, it is indispensable for prompt speed change to quickly control the rotation speed. Moreover, the slow change in the rotation speed enables a reliable speed change.

At step S6, the gear 15 is engaged with the gear 14.

Thus, the speed change operation is completed.

Incidentally, steps S1 and S4 correspond to an engine control device. Further, steps S3 and S6 correspond to a speed change control device.

With such a constitution, a speed change operation can be smoothly performed without a clutch.

Consequently, a space-saving system is realized. Especially, this embodiment is most suitable for a hybrid vehicle on which a large battery is mounted.

Additionally, the cost of the system is reduced. Further, the system using the gears has given actual results, so that the reliability of the system is enhanced.

Next, a second embodiment of the present invention will be described hereinbelow.

In this embodiment, the engine consists of an internal combustion engine and a main motor. Further, a second transmission is provided between the internal combustion engine and the main motor. The first and second transmissions are controlled so that the first transmission performs a speed change operation by adjusting the rotation speed of the main motor to the rotation speed of the axle, which is employed as a reference rotation speed and that the second transmission performs a speed change operation by adjusting the rotation speed of an auxiliary engine to the rotation speed of the main motor, which is employed as a reference rotation speed.

Figure 7:
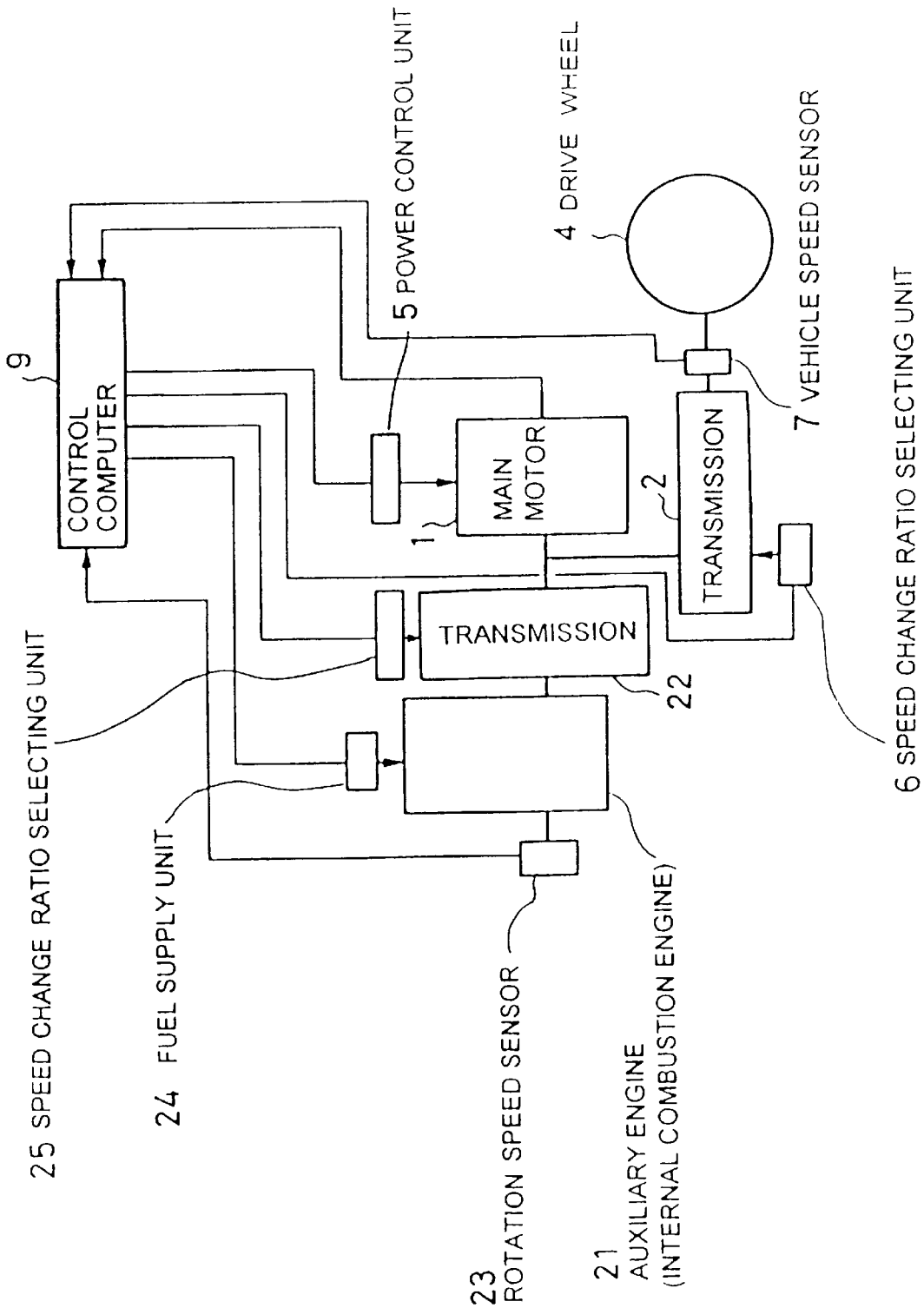
FIG. 7 is a diagram illustrating the constitution of a second embodiment of the present invention.

FIG. 7 illustrates the constitution of the second embodiment.

As shown in this figure, an internal combustion engine 21 is a heat engine and is an auxiliary engine provided for supplementing the driving force of the main motor 1.

A transmission 22 is provided between the internal combustion engine 21 and the main motor 1.

This transmission 22 is a mechanical one in which a driving force is transmitted from the internal combustion engine 21 to the main motor 1 by engaging the gears, similarly as in the transmission 2. Further, this transmission 22 has a plurality of speed change ratios and a neutral position.

The internal combustion engine 21 is provided with a rotation speed sensor 23 for detecting the rotation speed of the internal combustion engine 21. A sensor signal output from the rotation speed sensor 23 is input to the control computer 9. Moreover, the internal combustion engine 21 is supplied with fuel from a fuel supply unit 24 acting as an auxiliary engine control unit. This fuel supply unit 24 is controlled by a control computer 9.

A speed change ratio selecting unit 25 selects a speed change ratio of the transmission 22, similarly as the speed change ratio selecting unit 6 does. The speed change ratio selecting unit 25 is controlled by the control computer 9.

Next, an operation of this embodiment will be described hereunder.

Figure 8:
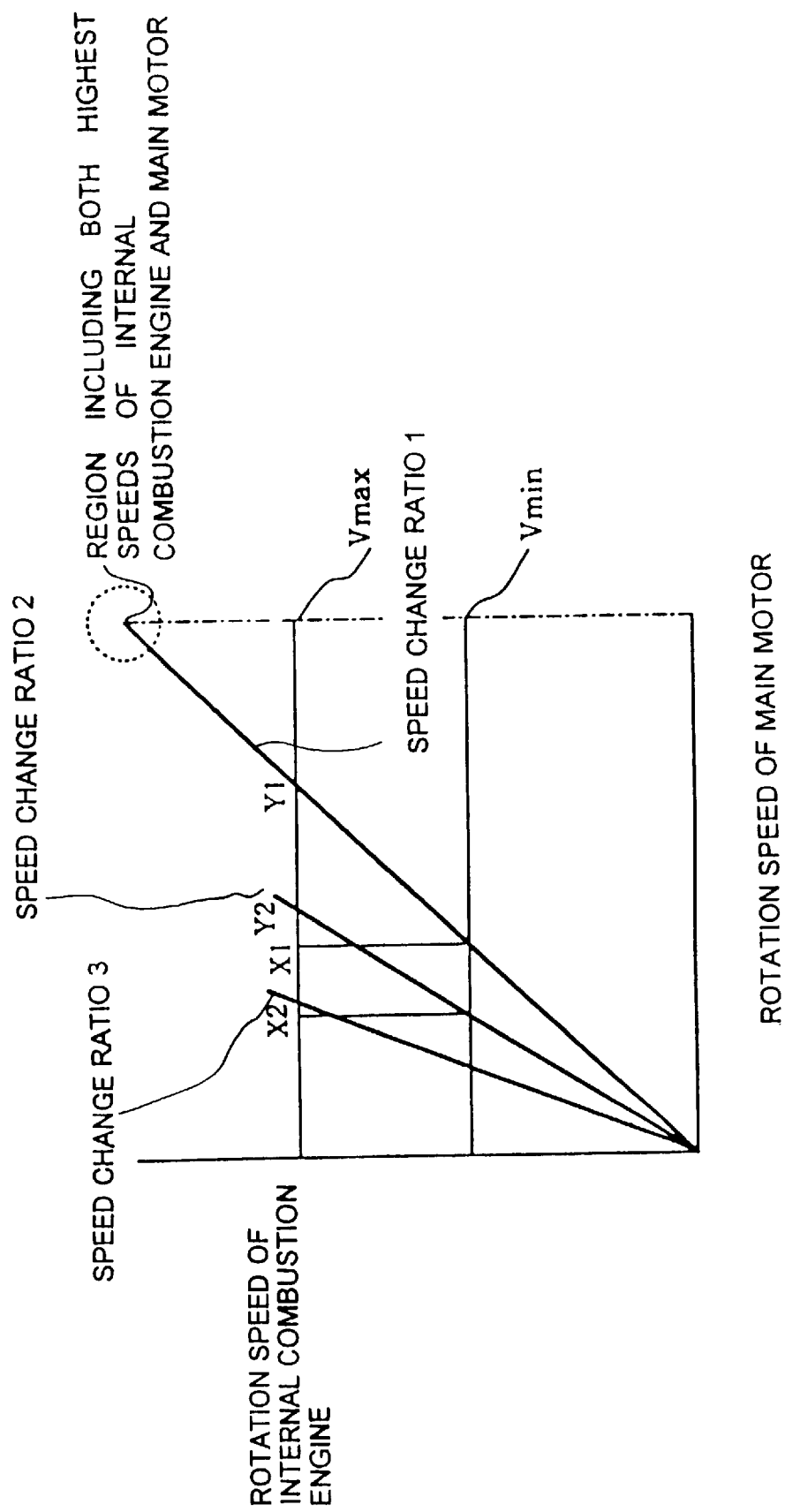
FIG. 8 is a graph illustrating the speed change ratio characteristics of the transmission shown in FIG. 7.

In the case of employing the internal combustion engine 21 as the auxiliary engine, the speed change ratio of the transmission 22 is set as illustrated in FIG. 8.

Namely, the lower limit rotation speed Vmin and the upper limit rotation speed Vmax of a desirable rotation speed range of the internal combustion engine 21 are set.

First, a speed change ratio, at which both of the highest rotation speeds of the motor and the engine are utilized at the same time, is set so as to attain the highest level of the performance of the engine. For example, in the case that the highest rotation speeds of the internal combustion engine 21 and the main motor 1 are 6000 rpm and 9000 rpm, respectively, the speed change ratio is ⅔ or so. This speed change ratio is employed as a "speed change ratio 1". The setting of such a speed change ratio is an essential problem to be treated by given preference over the problems of energy-saving and exhaust gas, because the engine is a device for generating motive power.

Subsequently, a point Y1 of intersection of a lateral line corresponding the upper limit rotation speed Vmax and a line corresponding to the "speed change ratio 1" is determined. Then, the rotation speed of the internal combustion engine 21 is reduced to the lower limit rotation speed Vmin. Further, the rotation speed of the main motor 1 is rendered constant. Thus, a point X1 of intersection of a perpendicular line corresponding to this constant rotation speed of the main motor 1 and the lateral line corresponding the upper limit rotation speed Vmax of the internal combustion engine 21 is determined. Then, a "speed change ratio 2" indicated by a line passing through a point between the points X1 and Y1 of intersection is determined. Similarly, a "speed change ratio (n+1)" is determined for each integer "n" in such a manner as to be indicated by a line passing through points Xn and Yn of intersections.

If a speed change operation is performed by employing such speed change ratios as reference ratios, the next speed change ratio to be selected has already been prepared before the rotation speeds reach the limit values. Consequently, the speed change operation is performed without deviating from, the desirable operating region.

Thus, as a result of providing the transmissions 2 and 22 in the system, the transmission 22 makes up for the shortage of low-speed torque of the main motor 1. The power output from the internal combustion engine 21 acting as the auxiliary engine is transmitted through both the transmissions 2 and 22 by performing speed change operations. Consequently, a multi-number of speed change is realized. This enables the system to operate the internal combustion engine 21 as the auxiliary engine, at speeds within a suitable speed range.

For instance, in the case that the transmission 2 is a four-speed one and the transmission 22 is a two-speed one, a number of speed from the internal combustion engine 21 to the driving wheel 4 are eight speeds. Further, a number of speed from the main motor 1 to the driving wheel 4 are two speeds. Thus, both of the fine rotation control of the internal combustion engine 21 and the efficient transmission of a rotation force between the main motor 1 and the driving wheel 4 are enabled.

In the case of the conventional system provided with a torque converter between the main motor and the driving wheel, when a driving force is provided only by a motor in the low-speed running area, the temperature of hydraulic oil rises owing to the strong low-speed torque of the motor. Further, the fuel consumption efficiency of the system is not improved.

If the number of poles of the motor is increased in the low-speed area, the size of the motor is too large for considering the magnitude of an output thereof. Further, the weight of such a motor is too heavy.

Moreover, in the case that the rotation force of the internal combustion engine is increased by the continuously variable transmission and is then superimposed on the rotating force of the motor, the motor overworks during deceleration when a constant operation of the internal combustion engine is performed. Furthermore, the regenerative braking cannot catch up with the demand therefor. At present, there is a limit to the transmission capacity of the continuously variable transmission. Further, as compared with the gears or the like, the continuously variable transmission is a mechanism including a large stress. Moreover, since a large force is required to control an inclined pulley, the system including a control mechanism is rather bulky.

However, the second embodiment easily increases the generated torque.

Additionally, when the vehicle speed changes, the rotation speed of the internal combustion engine 21 varies, differently from the continuously variable transmission. However, according to the second embodiment, a fine multi-number of speed change is easily achieved. Further, this embodiment is more efficient in transmitting the rotating force, as compared with the transmission by a belt or hydraulic oil. Moreover, in view of the durability, reliability and cost of the apparatus, this embodiment is very useful.

Incidentally, regarding the layout of the system, there is no need for placing the internal combustion engine 21, the transmission 2, the main motor 1 and the transmission 22 in series. Briefly, the system according to the present invention is obtained by changing the speed of the internal combustion engine 21 through a multi-number of speed change, and then transmitting the changed speed to the driving wheel 4.

Further, in the case of this embodiment, the rotation speed sensor 8 is used for detecting the rotation speed of the main motor 1. However, if a synchronous motor having sufficient capacity is employed as a motor, the rotation speed of the magnetic field of the synchronous motor is utilized.

In a synchronous motor, a rotor is rotated by separately providing a d. c. power supply or by using a permanent magnet. The rotation of the rotor is performed in synchronization with the rotation of a magnetic field. The rotation speed of the magnetic field is always in agreement with the rotation speed of the rotor. The rotation speed of the magnetic field is known from the a. c. frequency generated by the control computer.

In the case that a synchronous motor is used for the aforementioned reason, the rotation speed sensor 8 may be omitted. This contributes to the simplification of the system. Moreover, the reliability of the system is enhanced.

Furthermore, in the case of controlling the rotation speeds of the input shaft and the output shaft of the transmission 2 and performing a shift operation when the relative speed of a target gear of a speed change operation is almost zero, the utility value of the synchronous motor, whose rotation speed can be controlled in accordance with instructions from the control computer 9, is high. The synchronous motor has advantages in easiness and precision of controlling the rotation speed as instructed by the control computer.

On the other hand, even in the case of employing an induction motor as the main motor 1, the rotation speed of the main motor 1 can be detected by using the vehicle speed sensor 7.

In the induction motor, the rotation speed of a magnetic field is not always in agreement with the rotation speed of a rotor, for the following reason. Namely, due to an operation principle wherein the difference between the rotation speed of the magnetic field and the rotation speed of the rotor causes electric current to flow through a rotor-side coil, the magnetization of the rotor is performed by this electric current. Consequently, torque is generated by the induction motor. There is always a difference between the rotation speed of the magnetic field and the rotation speed of the rotor, on such an operation principle.

Figure 9:
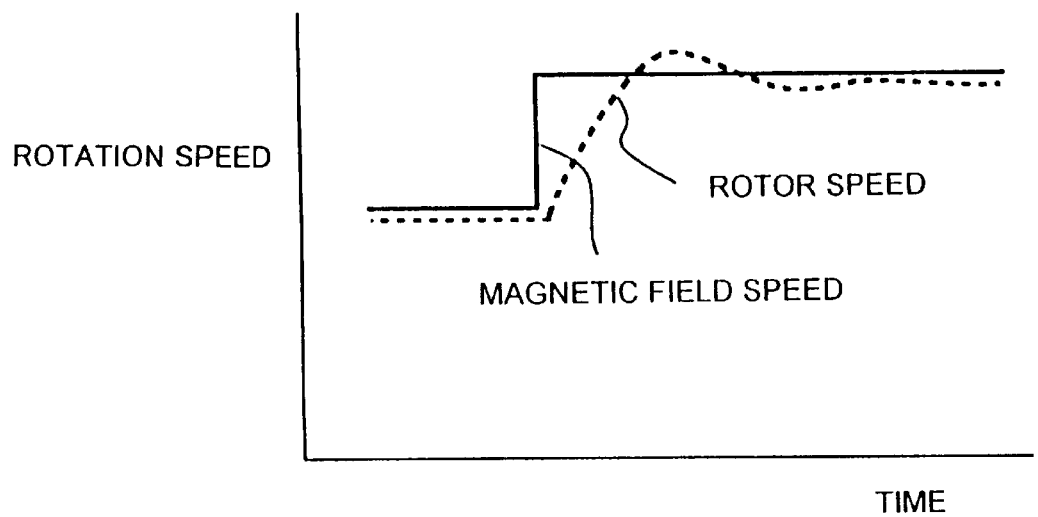
FIG. 9 is a graph illustrating the rotation speed of an induction motor used as the motor shown in FIG. 7.

However, in the case that the induction motor is operated without load, the rotation speed of the magnetic field is nearly in agreement with the rotation speed of the rotor. When a no-load operation is performed by changing the rotation speed of the magnetic field in a step-like manner in a direction of increasing the speed thereof, the rotor speed follows the magnetic field speed, as illustrated in FIG. 9, to exceed once the rotation speed of the magnetic field. Thereafter, the rotor speed converges into a speed which is a little lower than the magnetic field speed.

Figure 10:
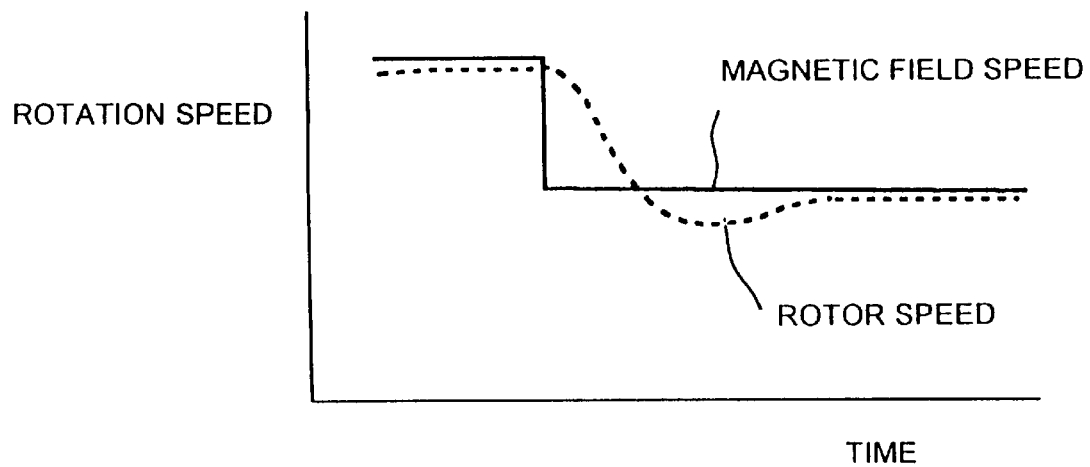
FIG. 10 is a graph illustrating the rotation speed of an induction motor used as the motor shown in FIG. 7.

Further, when the induction motor is operated without load by changing the magnetic field speed in a step-like manner in a direction of decreasing the speed thereof, the rotor speed overshoots to a speed lower than the magnetic field speed, as illustrated in FIG. 10. Thereafter, the rotor speed somewhat increases and converges into a speed which is closed to and a little lower than the magnetic field speed. Under such phenomena, the rotor speed converges to a speed which is a little lower than the magnetic field speed, after a lapse of a certain time period when the induction motor is operated without load.

Such phenomena slightly vary with the moment of inertia and the quality of bearings of the rotor and with the degree of change in the magnetic field speed. However, such phenomena have common properties. The difference between this magnetic field speed and the converged rotation speed of the rotor originates from bearing resistance during a no-load operation and from a resistance force consumed by a cooling blower. Although the difference therebetween slightly varies with an environment temperature, certainly, this difference is uniquely determined by the rotation speed of the induction motor. Namely, the difference is known from the experimental value thereof. Further, a time required to converge the difference is known from the experimental value thereof. Therefore, the rotation speed of the induction motor operating under no load is determined from the magnetic field speed obtained after a lapse of a suitable convergence time.

Incidentally, the vehicle speed sensor 7 may be used for detecting the rotation speed of the main motor 1. Upon completion of the speed change operation, when some gears of the transmission are engaged, the rotation speed of the main motor 1 is calculated from the rotation speed detected by the vehicle speed sensor 7 and the speed change ratio of the gears. The utilization of the calculated value of this rotation speed and the actually measured value of the vehicle speed enables the use of the vehicle speed sensor 7 as a substitute for the rotation speed sensor 8 that is used for detecting the rotation speed of the main motor 1.

Furthermore, in the case of performing a speed change operation by nearly equalizing the rotation speeds with each other, very high precision data is needed. If such data is realized by a rotary encoder, the rotary encoder is required to have high performance, for example, more than 1000 pulses per cycle, further, the response speed of 20 KHz or more by a photointerrupter. However, although a small number of such rotation speed sensors are produced as a sensor for detecting the speed of a gyro of a satellite spacecraft, such sensors are expensive. The cost of popular goods, such as motor vehicles, cannot be disregarded. Moreover, there are restrictions, such as an installation environment temperature, on such sensors.

However, by utilizing the vehicle speed sensor 7 in this way, a sensor is mounted on a mounting part of the system, to obtain the rotation speeds of other parts by calculation. Consequently, a space-saving system can be realized.

Next, a third embodiment of the present invention will be described hereinbelow.

This embodiment is adapted to control the connection/disconnection of the transmission 22 according to at least signals representing the rotation speed of the main motor 1 and the stepping-on amount of an accelerator pedal, select a speed change ratio of the transmission 22 provided between the main motor 1 and the internal combustion engine 21 when the conditions for connecting the transmission are met, and select a speed change ratio of the transmission 2 provided between the main motor 1 and the drive shaft 3.

Incidentally, the accelerator is provided with an accelerator sensor (not shown) for detecting a stepping-on amount of the accelerator pedal. Further, a sensor signal output from this sensor is input to the control computer 9.

FIG. 11 is a graph illustrating a speed change control method to be performed according to signals representing the rotation speed of the main motor 1 and the stepping-on amount of the accelerator pedal, respectively.

As illustrated in FIG. 11, threshold values Ehigh and Elow for the rotation speed of the main motor 1 and the stepping-on amount are preliminarily determined.

These threshold values Ehigh and Elow are set so that the internal combustion engine 21 is operated in optimum use areas as illustrated in FIGS. 12 and 13.

In the low-speed running area where the vehicle speed is equal to or lower than a certain value, the vehicle runs by the motive power provided from the main motor by canceling the mechanical connection between the internal combustion engine 21 and the drive shaft 4. Incidentally, the mechanical connection between the internal combustion engine 21 and the drive shaft 4 is established when the vehicle speed is low but the stepping-amount of the accelerator pedal is large, for instance, upon up-hill climbing.

More particularly, in the low-speed running area, large motive power is unnecessary. In the case of running in a city where the repetition of acceleration and deceleration is frequently performed, an area, in which the auxiliary engine is disconnected, is enlarged to stop the operation of the internal combustion engine 21 or limit the operation of the engine 21 for the purpose of generation of electric power. Thus, more weight is placed on the running by the main motor 1.

Conversely, in the case of the low-speed running, when a relatively large driving force is needed, for instance, when a truck climbs a long sloping road, the motive power generated by the internal combustion engine is directly utilized when a variation in the speed is small during up-hill climbing.

If a continuously variable transmission is employed, in order to maintain the rotation speed of the internal combustion engine at a constant value, the ratio between the vehicle speed and the rotation speed of the internal combustion engine is arbitrarily changed. Conversely, if a mechanical transmission is employed, a change in the vehicle speed directly results in a change in the rotation speed of the internal combustion engine. Therefore, an abrupt change in outputs, such as the rotation speed, of the engine is undesirable for pollution control and energy-saving.

At that time, it is very important for device of controlling the mechanical connection between the internal combustion engine 21 and the drive shaft 4 to shift the gear of the transmission to the neutral position. An area in which the motive power is disconnected for the speed change operation, is preliminarily determined.

Further, the transmission is in the connected state on the thick line in FIG. 11.

In the remaining areas, the transmission is in the disconnected state. Incidentally, if the stepping-on amount of the accelerator pedal is very large, the use area of the internal combustion engine 21 is expanded to the levels Emax and Emin.

In the case that the gears of the transmission is connected when the speed of the main motor 1 is low, when the lower limit speed of the internal combustion engine 21 cannot be maintained, or that the stepping-on amount of the accelerator pedal is small, the transmission is controlled in such a manner as to be shifted to the neutral position.

However, if the system is constructed on the assumption that precise control is performed thereon, a control operation can be performed not only by using simple threshold values but also by dividing an operation area into a disconnection region, a connection region and further a transition region corresponding to the case where the speed change operation is being performed. This is effective in enhancing the performance of the engine. At that time, boundary conditions at that time may be given as calculation values calculated based on the vehicle speed and the stepping-amount of the accelerator pedal. Alternatively, preliminarily obtained experimental values stored in storage elements may be read, as the need arises, and used as boundary conditions.

Further, there is the needs for accurately knowing the rotation speeds as a factor determining this clutch function and for judging whether or not the vehicle speed is constant. To obtain a relatively stable good result of the judgment, the judgment is made by obtaining the difference between the latest sampled value of the vehicle speed and the mean value of the vehicle speed values sampled at constant time intervals. For example, the difference between the sampled values is not easily found from the simple comparison between the latest sampled value and the sampled value just preceding thereto, because the sampling of the values is performed at extremely short cycles. However, a distinct difference is obtained if the sampling is performed every 1000 cycles or so. Further, if a value to be compared with the latest sampled value is the mean value of a plurality of the past sampled values, the possibility for making an erroneous judgment on a variation in the speed, in which no indication of only one of acceleration and deceleration is found, is reduced. For example, in the case that, although a driver considers that the vehicle runs at the speed of 80 Km/hr, actually, there is a variation in the vehicle speed between 75 and 85 Km/hr, there is very low possibility for erroneously judging that the vehicle is accelerated or decelerated. Namely, it is judged that the vehicle runs at a constant speed. Thus, the stability or reliability of the judgment is enhanced.

The process of sampling a value every 1000 cycles is performed as follows. Namely, a counter is preliminarily provided in the system. Then, 1 is added to the counter every cycle. When the indication by the counter reaches 1000, the values of the vehicle speed and the stepping-on amount of the accelerator pedal are captured. Alternatively, 1000 is preliminarily set in the counter,. Then, 1 is subtracted from the counter every cycle. When the indication by the counter reaches 0, such values are captured. Alternatively, data representing Cycle No. is preliminarily provided in the system. Further, when the current Cycle No. is divided by 1000 without a remainder, the values of the vehicle speed and the stepping-on amount of the accelerator pedal are captured. This process may be performed by using either a software-implemented method or a hardware-implemented method.

The process of obtaining the mean value of the plurality of the past sampled values is performed as follows. Preliminarily, a location in RAM is reserved for storing the mean value. Further, 0 is set at the location as an initial value. For instance, in the case of obtaining the mean value of 10 sampled values, the latest sampled value is added to a value obtained by multiplying the current mean value by 9, then, a result of such an addition is divided by 10. Subsequently, a resultant value of this division is set at the location so as to use this resultant value in the next judgment.

Incidentally, although the clutch function is controlled by using the rotation speed of the main motor 1 and the stepping-on amount of the accelerator pedal as data for the judgment, it is effective in effective utilization of the generated power and suppression of the generation of exhaust gas that the boundary conditions for clutch function control are regulated according to the power supply voltage provided by the battery or the like and to the warming-up condition of the engine.

When driving a motor vehicle whose clutch is out of order, some skilled drivers shift the gears by carefully adjusting the rotation of the internal combustion engine to that of the shaft of the gearbox. A garage mechanic is an expert at treating such a motor vehicle halted on a road owing to the failure of a clutch. If the vehicle is in the vicinity of his service garage, he may bring the vehicle thereto by driving the vehicle without towing.

Thus, if the rotation speed of the engine is synchronized with that of the shaft of the gearbox, a driver can operate the vehicle as if the clutch were normal. For example, in the case of a system (to be described later) employing an auxiliary engine obtained by uniting an internal combustion engine and a control motor, the rotation speed of the internal combustion engine can be very precisely controlled. Therefore, if such a function is performed by utilizing the neutral position, even an ordinary driver may drive the vehicle better than a skilled driver.

As described above, this embodiment is adapted so that the connection/disconnection of the transmission 2 is controlled according to signals representing the rotation speed of the main motor 1 and the stepping-on amount of the accelerator pedal. Thus, the transmission 2 is controlled according to the driving conditions of the vehicle. Moreover, the internal combustion engine can be operated in the optimum conditions, namely, with high thermal efficiency and durability.

Incidentally, such control method of the connection/disconnection of a transmission may be applied to the transmission 2.

Next, an operation of selecting a speed change ratio of the transmission 22 will be described hereunder.

The internal combustion engine 21 and the main motor 1 are connected to each other at fixed speed ratios, respectively. Thus, if the gear is not shifted, there is established a certain proportional relationship between the rotation speeds of the main motor 1 and the internal combustion engine 21.

FIG. 14 is a graph illustrating the selection of a speed change ratio on the basis of the rotation speed of the main motor 1. In this figure, the selection of a speed change ratio in the case of the two-speed transmission 2 adapted to be shifted to a high-speed gear and a low-speed gear will be described by way of example.

Similarly as in the case of the second embodiment, the appropriate upper limit rotation speed Vmax and the appropriate lower limit rotation speed Vmin are set in the internal combustion engine 21, in view of thermal efficiency, pollution control and durability. Moreover, a shift-up control point Vup and a shift-down control point Vdown are provided between the upper limit rotation speed Vmax and the lower limit rotation speed Vmin according to the stepping-on amount of the accelerator pedal.

Generally, when the stepping-on amount of the accelerator pedal is small, the use area of the internal combustion engine 21 is slightly shifted to the low-speed area side. Conversely, when the stepping-on amount of the accelerator pedal is large, the use area of the internal combustion engine 21 is shifted to the high-speed area side.

A judgment as to whether or not a speed change operation should be performed is made as follows.

Namely, for the purpose of operating the internal combustion engine 21 within an appropriate certain speed range, data representing if the rotation speed of the internal combustion engine 21 is within the appropriate certain speed range, is used for such a judgement. An optimum speed change ratio is calculated on the basis of the rotation speed of the main motor 1, then, a speed change ratio, which is closest to the optimum speed change ratio, is determined. Alternatively, in the case of using a plurality of gears, a combination of the gears, which gives the speed change ratio being closest to the optimum speed change ratio, is determined. If the current state corresponds to the optimum value or has no problem, the current state is maintained. If the current state is not optimum, a speed change operation is performed. If the speed change operation is unnecessary, the following step is skipped.

When it is judged that the speed change operation is to be performed, the difference between the rotation speeds of the gears to be engaged is calculated. Further, it is judged which of the rotation speeds of such gears is higher than that of the other gear.

Namely, the gears are disengaged, then, the input rotation speed and the output rotation speed of the gears to be engaged for performing the speed change operation are measured. If the difference therebetween is within an appropriate range, the alteration of the engagement between the gears is performed by sending a signal to the speed change ratio selecting unit acting as an actuator.

If the difference therebetween is deviated from the appropriate range, an output of the internal combustion engine is adjusted by operating a throttle valve and the like of the engine. Further, the internal combustion engine side rotation speed is controlled in such a manner as to decrease the difference therebetween.

Thus, the output of the engine is controlled so that the difference between the input and output rotation speeds is eliminated. If the difference therebetween is within an allowable range, the speed change operation is performed. If the gears are in a state where the speed change operation cannot be performed, it is detected which of the rotation speeds of such gears is higher than that of the other. Then, the system is further controlled so that the difference therebetween is eliminated.

As described above, a speed change ratio of the transmission 22 is selected according to signals representing the rotation speed of the main motor 1 and the stepping-on amount of the accelerator pedal, respectively. Consequently, the internal combustion engine is operated in the optimum condition with high thermal efficiency and durability, by considering the operating condition of the motor vehicle.

Next, an operation of selecting a speed change ratio of the transmission 2 provided between the main motor 1 and the drive shaft 3 will be described hereinbelow.

Figure 15:
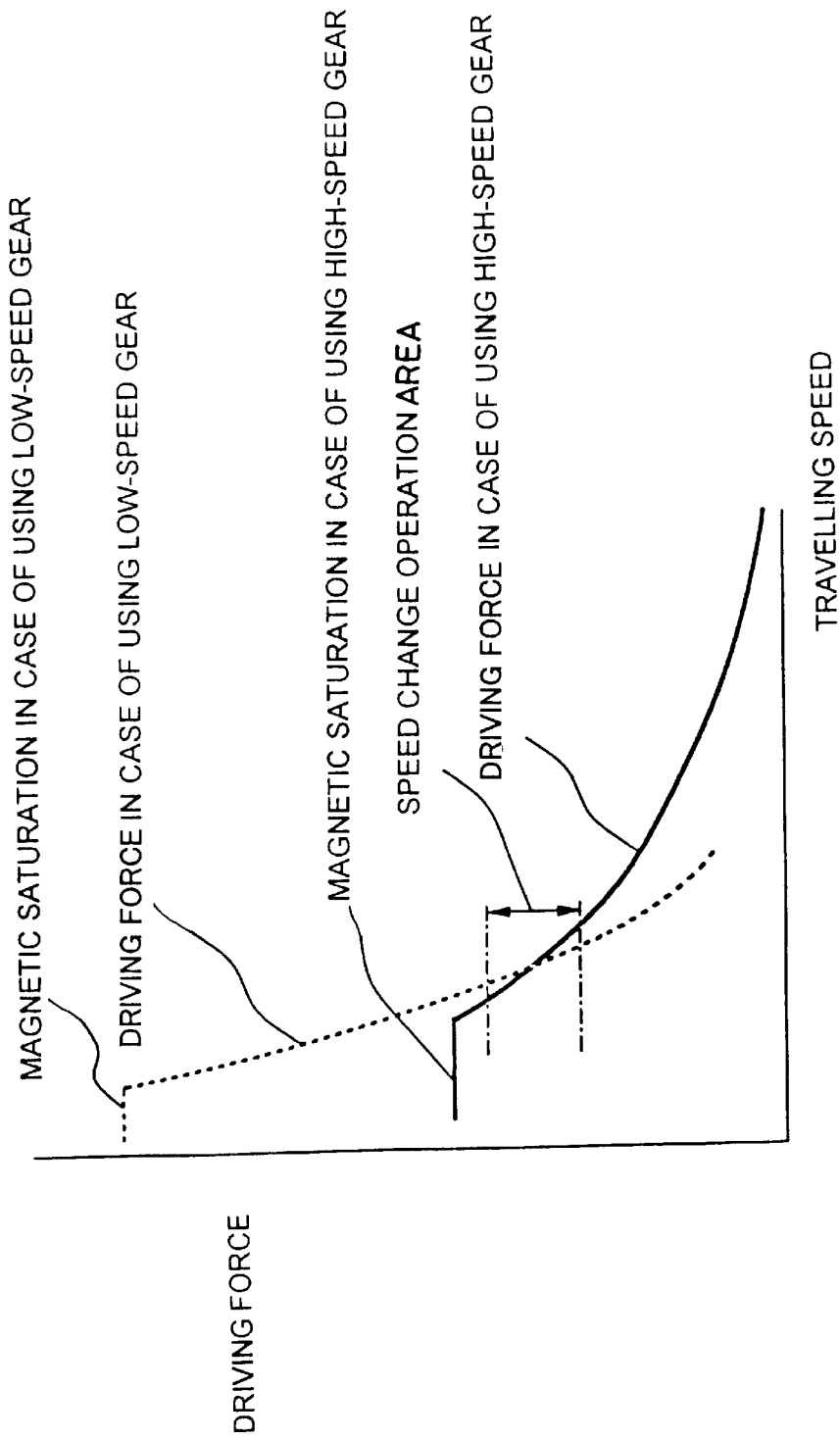
FIG. 15 is a graph illustrating an operation when a speed change operation is performed.

FIG. 15 is a graph illustrating an operation of selecting a speed change ratio of the transmission 2.

Similarly as the motor vehicles using a composite engine system, automobiles adapted to run by using a motor as a main engine have encountered difficult problems concerning the power transmission provided between the motor and the drive shaft. Differently from the motor vehicles that employs the internal combustion engine as an engine and should comprise a transmission, electric cars have a problem in that the cars can run without a transmission, though this is an advantage peculiar to the motor. Users are apt to provide no transmissions in the cars, if the electric cars can run without transmission.

However, in the world where electric cars will come into wide use in future, most of the automobiles have high-performance internal combustion engines mounted thereon. If the electric cars are equaled such automobiles in the accelerating ability from standstill state, a problem of the driving force during the low-speed running should be solved. Hitherto, methods for increasing the low-speed torque without a transmission have been studied with the intention of dispensing with a transmission. However, to obtain such accelerating ability, the problem of the driving force during the low-speed running should be solved by using a transmission.

As shown in FIG. 15, when the stepping-on amount of the accelerator pedal is small, the vehicle can run by starting from the standstill state and being accelerated by continuing the use of the high-speed gear until the vehicle speed reaches the highest speed. In the low-speed running area, when the stepping-on amount of the accelerator pedal is large, high rotation speed is demanded. It is advisable to shift the transmission to the low-speed gear in the area where the generated torque is prevented owing to magnetic saturation from increasing and the efficiency of the main motor 1 is reduced. However, so long as the low-speed gear is used, the vehicle cannot be operated in the high-speed running area where the rotation speed of the main motor 1 exceeds the allowable rotation speed. Therefore, even if the stepping-on amount is large, the vehicle should run by using the high-speed gear.

Next, a fourth embodiment of the present invention will be described hereinbelow.

This embodiment employs an auxiliary engine obtained by connecting the internal combustion engine and the control motor, and is adapted to change the speed change ratio between the auxiliary engine and the main motor 1 by controlling the internal combustion engine and the control electrode to synchronize the rotation speed of the internal combustion engine with that of the main motor 1.

Figure 16:
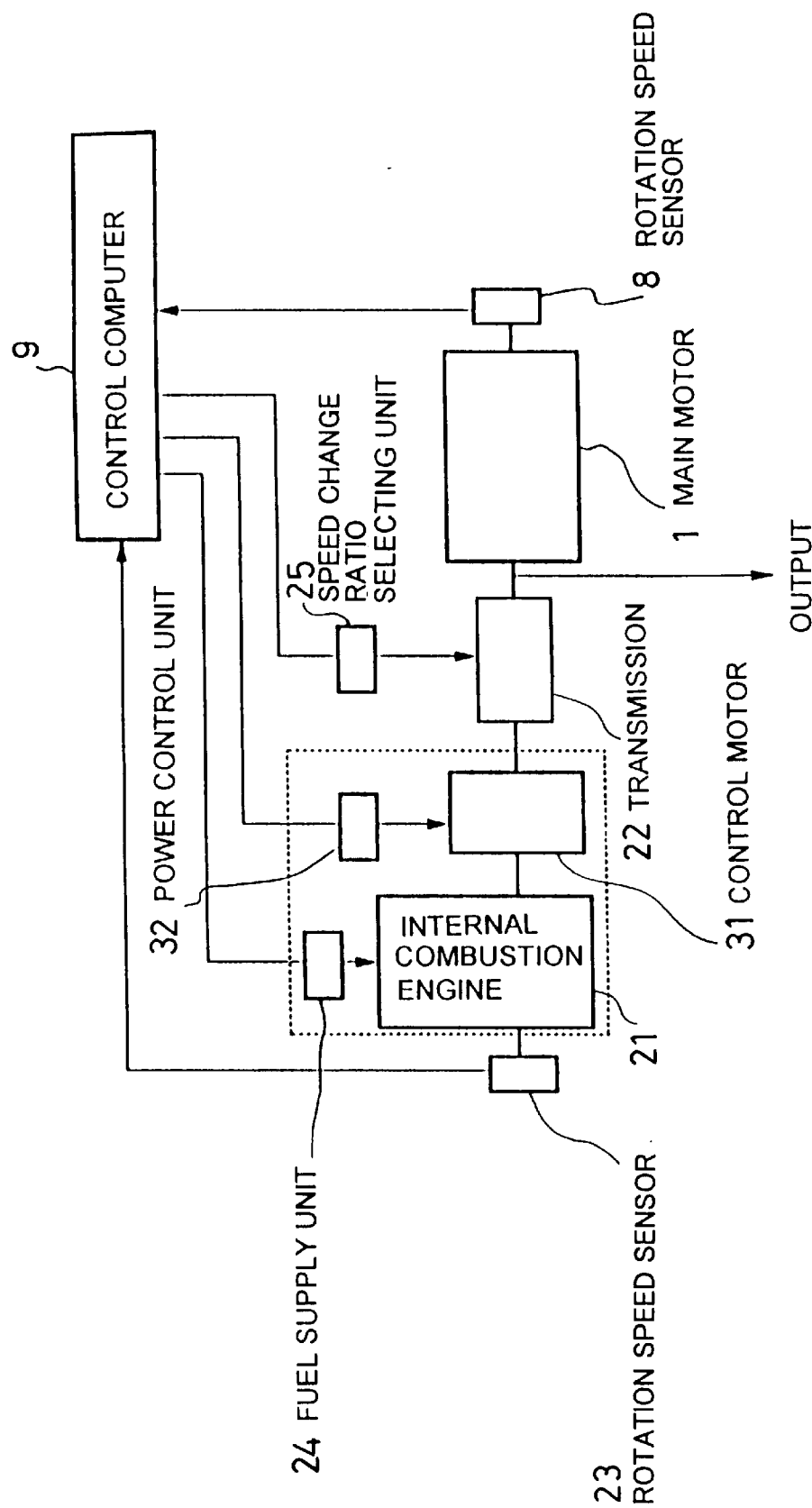
FIG. 16 is a diagram illustrating the constitution of a fourth embodiment of the present invention.

As shown in FIG. 16 which illustrates the fourth embodiment, a control motor 31 is connected to the internal combustion engine 21, and is supplied with power from a power control unit 32. This power control unit 32 is controlled by the control computer 9.

The transmission 2 provided between the main motor 1 and the drive shaft 4 is relatively easily provided with a control synchronization unit, because the control of the rotation speed of the main motor 1 is not so difficult.

However, it is not very easy for the transmission 22 provided between the internal combustion engine 21 and the main motor 1 to synchronize the rotation speed of the engine 21 with that of the main motor 1.

On the other hand, the main motor 1 rotates according to the vehicle speed. Therefore, although the vehicle speed slowly changes, there are high-level demands for the synchronization of the rotation speeds of the motor and the engine in the mechanical transmission, which does not use a clutch, differently from the conventional apparatus provided with a continuously variable transmission, in which the clutch is connected when the rotation speeds of the motor and the internal combustion engine are nearly synchronized with each other.

As compared with the case of constituting the auxiliary engine only by the internal combustion engine 21, this embodiment more easily controls the rotation speeds as a result of providing the control motor 31 therein. Thus, the precise and quick controlling of the rotation speeds are easily achieved.

When a speed change operation is performed, a no-load operation of the internal combustion engine 21 is not performed. Instead, the rotation speed of the engine 21 is gradually changed to a required rotation speed by utilizing the control motor 31 as a generator while the internal combustion engine 21 maintains the generation of predetermined torque.

Further, when the internal combustion engine 21 is started during the transmission of motive power by the gears is interrupted, such a control motor 31 is operated as a strong starter motor. Thus, this embodiment contributes to a primary complete explosion. Consequently, unburned hydrocarbon, which is discharged during a starting operation, is minimized.

When the internal combustion engine 21 is operated during the transmission of motive power is interrupted, the control motor 31 is operated as a generator. Thus, the internal combustion engine 21 is effectively utilized for power generation without performing of a no-load operation of the engine 21.

When the gears of the transmission 22 are engaged and motive power is transmitted, the rotation speeds of the internal combustion engine 21, the control motor 31 and the main motor 1 are equivalent to one another by shifting the transmissions 2 and 22 provided therebetween to certain speed change ratios. The control motor 31 is integral with the main motor 1 and functions as a generator or as a motor.

Namely, it does not occur that one of the control motor 31 and the main motor 1 operates as a generator and the other operates as a motor. If electric power is needed, both the control motor 31 and the main motor 1 operate as a generator. Conversely, if a driving force is needed, both the control motor 31 and the main motor 1 operate as a motor.

Incidentally, in light of the characteristics, especially, efficiency of the control motor 31 and the main motor 1, these motors may be adapted so that, in a condition which the vehicle runs by using low motive power, only one of these motors operate and the other is halted.

As described above, the synchronization of the rotation speeds with the synchronous speeds is precisely performed by providing the control motor 31 in the auxiliary engine. Moreover, the speed of the internal combustion engine 21 is quickly and reliably set at a target speed. In a state that the rotating force of the internal combustion engine 21 cannot be transmitted to the wheels when waiting for a traffic signal light to change, the motive power of the internal combustion engine 21 can be effectively utilized for generating electric power. When starting the internal combustion engine 21, the engine 21 is surely started. Moreover, the discharged amount of the unburned hydrocarbon is minimized.

Consequently, the fuel consumption is reduced. This control motor 31 is very important in the mechanical transmission.

Next, the fifth embodiment of the present invention will be described hereinbelow.

This embodiment employs an epicyclic gear in the transmission and includes a speed change function and a clutch function.

There is the need for connecting the internal combustion engine, the motor and the transmission as a compact system, as a whole. Especially, the transmission provided between the internal combustion engine and the motor essentially includes the clutch function. The epicyclic gear is a composing element that is easily adapted for this purpose.

Incidentally, the "clutch" referred to herein is a gear-like element or an element formed like a coupling provided with projections and depressions. Such a gear-like clutch is provided at a part on which the connection/disconnection of transmission of a rotating force can be performed by sliding such a gear-like element itself. Further, a coupling-like clutch provided with projections and depressions is provided at a part with which a gear itself should be engaged. The rotating force is transmitted by fitting one of such elements thereto and is interrupted by releasing such an element therefrom. This is the same with the sixth to eighth embodiments of the present invention.

The transmissions are placed at the input shaft side and the output-shaft-side of the main motor, respectively. Alternatively, the transmissions are placed at one of the input-shaft-side and the output shaft side of the main motor. However, if transmission using ordinary gears and requiring countershafts are employed, the outside shape of the transmission becomes warped and is not a concentric circle with the rotation shaft as a center thereof, because the shape of the main motor is a concentric circle with the rotation shaft as a center thereof. This is contrary to the demand for a compact system. Therefore, transmissions having outside shapes, which are concentric circles and analogous to the outside shape of the motor, are needed.

Further, practically, it can be assumed that simple two-speed transmission may be employed as the transmissions provided between the main motor and the internal combustion engine and between the drive shaft and the main motor. However, in the case of such transmissions, the axial sizes thereof can be considerably reduced by employing epicyclic gears.

Moreover, the transmissions are required to have the clutch function of interrupting transmission of the rotating force between the internal combustion engine and the main motor according to circumstances. However, such a clutch function is easily and simply achieved by epicyclic gears.

For example, let Za, Zb and Zc denote the number of teeth of a sun gear, the number of teeth of an epicyclic gear and the number of teeth of an internal gear, respectively.

a. In the case of using an epicyclic gear of the planetary type, Reduction Speed change ratio=$1/\{(Zc/Za)+1\}$ b. In the case of using an epicyclic gear of the solar type, Reduction Speed change ratio=1/{(Za/Zc)+1}
c. In the case of using an epicyclic gear of the star type, Reduction Speed change ratio=−(Za/Zc)

where the "−" designates "treversed".

Examples of the speed ratios are obtained as listed below.

TABLE 1

| Zc  | Za | Zb | Planetary Type | Solar Type | Star Type |
|-----|----|----|----------------|------------|-----------|
| 50  | 16 | 17 | 4.125          | 1.32       | −3.125    |
| 80  | 16 | 32 | 6              | 1.2        | −5        |
| 100 | 50 | 25 | 3              | 1.5        | −2        |

When these are applied to the transmission, for instance, in the case of the epicyclic gear of the solar type, the speed ratio of TABLE 1 is obtained when the sun gear of the epicyclic gear mechanism is fixed. If the sun gear is released, the engagement between the internal gear and the epicyclic gear is canceled. Namely, the rotating force is not transmitted. If the sun gear is provided with a brake and the fixing and releasing of the sun gear are operated by using this brake, this operation corresponds to the clutch function, as is known. It is significant that the composite engine system adopts this function. If the sun gear is connected to the internal gear or a carrier of the epicyclic gear after released from the fixed state, these three elements rotate as one piece in the epicyclic gear mechanism. Thus, the input speed, namely, the rotation speed of the input shaft is in agreement with the output speed, namely, the rotation speed of the output shaft Namely, such a state that the input speed is output without changing the speed, can be realized.

If an epicyclic gear mechanism having a speed ratio of 1.5 is provided between the auxiliary engine and the main motor and further, another epicyclic gear mechanism having a speed ratio of 3 is provided between the main motor and the drive shaft, the rotating force of the main motor can be utilized by being increased by three times. The speed ratio between the internal combustion engine and the drive shaft can be adjusted in four levels, namely, 1, 1.5, 3 and 4.5.

It is very desirable selection to provide an epicyclic gear mechanism between the auxiliary engine and the main motor as an necessary transmission. This is because the clutch function is easily achieved in addition to the speed change function.

Incidentally, in a stage where the motive power is transmitted from the engine to the drive shaft, the engine is positioned at a place having a certain height sufficient to the extent that the engine is prevented from being flooded or submerged. Conversely, since the axle center is positioned at a low place, usually, ordinary gears, such as spur gears or bevel gears, are more suitable for transmitting motive power therebetween to shift the rotation center or to change the direction of the shaft.

Figure 17:
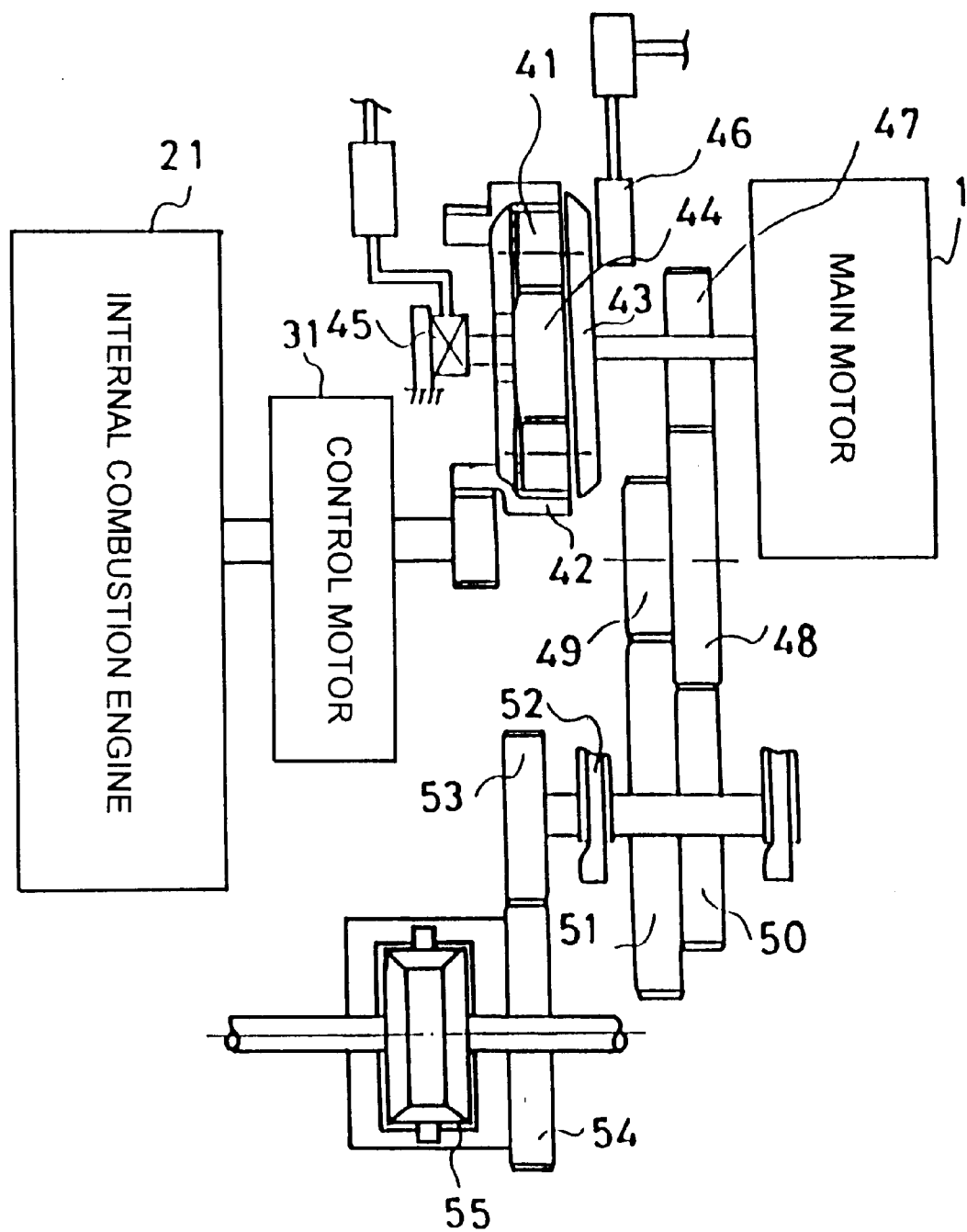
FIG. 17 is a diagram illustrating the constitution of a fifth embodiment of the present invention.

FIG. 17 illustrates the constitution of the transmission using an epicyclic gear of the solar type.

Incidentally, in this case, the combination of the internal combustion engine and the control motor is used as the auxiliary engine, similarly as in the case of the fourth embodiment.

An epicyclic gear 41 is provided at the auxiliary engine side between the auxiliary engine and the main motor 1. The rotation shaft of the auxiliary engine is connected to a peripheral internal gear 42. The rotation shaft of the main motor 1 is connected to a carrier 43 of the epicyclic gear 41. A sun gear 44 can be selectively fixed or freely rotated by means of a sun gear clutch 45. Each of the peripheral internal gear 42 and the carrier 43 of the epicyclic gear 41 can selectively perform a uniform rotation or a free rotation by a carrier clutch 46. Incidentally, the connection relations among these composing elements are not limited to those described hereinabove. In the present embodiment, the constitution is determined according to the allowable rotation speeds of the internal combustion engine 21 and the main motor 1 and to the easiness of constitution.

An output gear 47 is mounted on the rotation shaft of the main motor 1 and transmits the rotating force of the motor 1 acting as an engine to a counter-gear 48. This counter-gear 48 is securely connected to a counter gear 49 to perform uniform rotations. These counter-gears 48 and 49 and engage with receiving gears 50 and 51, respectively. The receiving gears 50 and 51 rotate at different speeds, respectively.

The constitution is such that as a result of a lateral movement of a gear shift fork 52, one of the receiving gears is selected, or if the gear shift fork 52 is stopped at an intermediate position, the transmission is at the neutral position. Thus, the rotating force is transmitted to a final gear 54 through an output gear 53. This rotating force is divided by a differential gear 55 into the rotating forces of the left and right wheels, to thereby drive the driving wheels, respectively.

Incidentally, note that the epicyclic gear mechanism provided between the auxiliary engine and the main motor 1 is characterized in the following respects. Solenoid valves 56 and 57 are supplied with appropriate oil pressures from an oil pressure source (not shown). When the solenoid valve 56 opens and an oil pressure is applied to the rear surface of a sun gear clutch plate, the clutch plate moves leftwardly, and the sun gear 44 is stopped. When the oil pressure is released, the pressing force vanishes and stopping torque is lost, thereby enabling the sun gear 44 to freely rotate.

When the solenoid valve 57 is opened, an oil pressure is exerted upon the rear surface of the carrier clutch 46. Then, the carrier clutch 46 commences uniform rotations together with a case containing the internal gear 42. In the case that both of the clutch 46 and the case perform free rotations, the motive power output from the auxiliary motor is not transmitted to the main motor 1 side. Thus, the clutch is disengaged. Conversely, when both of the clutch 46 and the case are connected, the parking brake is applied. These are summarized as follows.

| Sun Gear Clutch | Carrier Clutch | Operating State |
|-----------------|----------------|-----------------|
| 1 Released      | Released       | Motive Power Interrupted |
| 2 Released      | Fixed          | Constant Speed Power Transmission |
| 3 Fixed         | Released       | Power Transmission at Predetermined Speed Change Ratio |
| 4 Fixed         | Fixed          | Parking Brake Applied |

Next, a sixth embodiment of the present invention will be described hereinbelow.

This embodiment is adapted so that the transmissions provided between the main motor and the auxiliary motor and between the drive shaft and the main motor, respectively, have the countershaft in common. This embodiment comprises an oil pump that operates by being driven from a point on the rotating force transmitting path between the main motor and the drive shaft.

There is the distinct difference in functions between the transmission provided between the auxiliary engine and the main motor and the transmission provided between the main motor and the drive shaft. However, these two transmissions are closely related to and inseparable from each other, for constituting an integrally composite engine system.

In principle, the rotating force generated by the internal combustion engine is transmitted to the drive shaft through the first and second transmissions. The more rotating force transmits through the complicated transmitting path, the more loss of the rotating force occurs. The effective thermal efficiency decreases for that. The method of making the auxiliary engine, the main motor and the drive shaft to have the countershaft in common is the simplest and quickest one to meet the principle of performing a speed change without a clutch.

This embodiment has a constitution in which the countershaft of the transmission provided between the main motor and the auxiliary engine also acts as the countershaft of the transmission provided between the drive shaft and the main motor. In the case that the auxiliary engine and the main motor perform uniform rotations, outputs of the auxiliary engine are transmitted to the countershaft through a driving gear at the main motor side. In the case that a device for performing the speed change function is inserted into between the auxiliary engine and the main motor, outputs of the auxiliary engine are transmitted by a driving gear at the auxiliary engine side to the countershaft. At that time, the driving gear at the main motor side serves as a driven gear that is driven by the auxiliary engine.

Further, the reason for providing the oil pump, which operates by being driven from an point on the rotating force transmitting path from the main motor to the axle, in the apparatus is as follows. Namely, the rotation speed of the main motor may be 10,000 rpm or higher. Thus, sufficient lubrication is indispensable for lubricating the transmission itself and for other purposes.

Especially, in the case that a power transfer unit is formed as a combination of the first and second transmissions and the differential gear in one piece, it is necessary for ensuring the capability of running a path covered with water to dispose the main motor at a place higher than the position of the differential gear. Moreover, particular attention should be paid to the driving of a lubricating pump for causing the main motor to rotate at a high speed at a high place.

There are two rotating systems in the power transfer unit constructed by combining the two transmissions into one piece. One is a system that is originated in and relates to the rotation of the auxiliary engine and rotates at a speed proportional to the rotation speed of the auxiliary engine. The other is a system that is originated in and relates to the rotation of the main motor and rotates at a speed proportional to the rotation speed of the main motor.

Next, regarding the oil pump, the auxiliary engine system and the main motor system, which serve as motive power sources for driving the oil pump, are compared with each other. If the oil pump is connected to the auxiliary engine system, no oil pressure can be generated when the vehicle runs by utilizing only the motive power generated by the main motor 1. As a result, ill effects are exerted upon the gears and bearings connected to the main motor 1, for instance, the gears and bearings lack lubricant oil film. Conversely, in the case that the oil pump is driven by the main motor system, oil pressures are generated at all times during the vehicle runs. Thus, lubricating effects are satisfactorily obtained.

Figure 18:
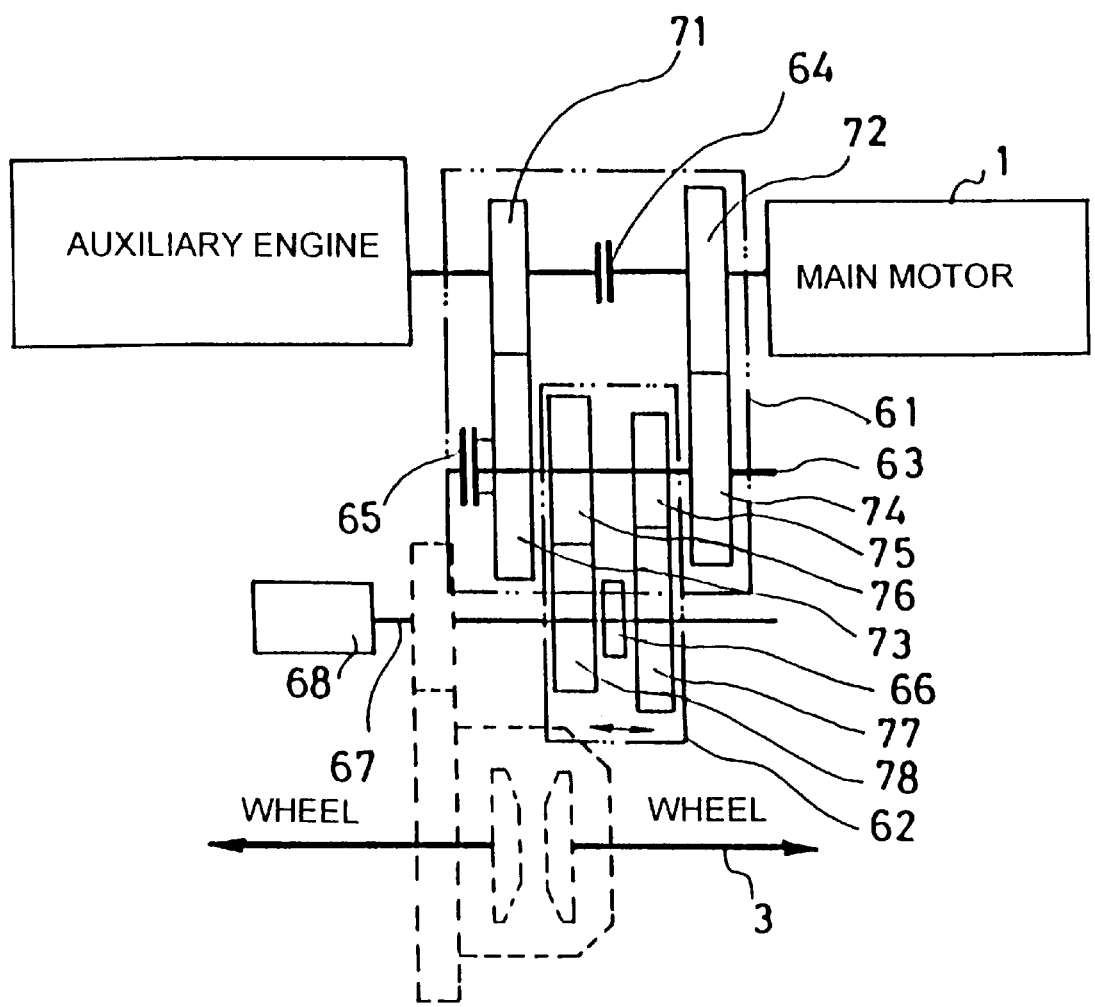
FIG. 18 is a diagram illustrating the constitution of a sixth embodiment of the present invention.

Additionally, the oil pressure generated in this way is utilized for lubricating the main motor. Further, the oil pressure can also be utilized for lubricating various equipment provided at the auxiliary engine side, if there is a margin of capacity. Consequently, an effect on the unification of lubrication of the system can be obtained, FIG. 18 shows the constitution of the sixth embodiment of the present invention.

As shown in this figure, a first transmission 61 provided between the main motor 1 and the auxiliary engine and a second transmission 62 provided between the drive shaft 3 and the main motor 1 have the countershaft 6 in common. An oil pump 68 is attached to an output shaft 67.

When a clutch 64 is engaged, the auxiliary engine is directly connected to the main motor 1. When the clutch 64 is disengaged, the transmitting path goes from a gear 71 through a gear 73, a selector 65 and a gear 74 to a gear 72. Thus, the rotating force is transmitted through this path, so that a speed change is enabled. There are two rotating force transmitting paths between the auxiliary engine and the countershaft 65. One is the path that goes through the gears 71 and 73. The other is the path that goes through the clutch 64 and the gears 72 and 74.

There are two rotating force transmitting path between a countershaft 63 and the output shaft 67. Each of these paths, one being the path going through the gears 75 and 77 and the other being the path going through the gears 76 and 78, is selected by means of a selector 66. Consequently, the corresponding speed change ratio can be selected.

Namely, with such a constitution, four speed change ratios can be realized correspondingly to the path between the auxiliary engine and the output shaft 67.

On the other hand, two speed change ratios can be realized correspondingly to the path between the main motor 1 and the output shaft 67. Incidentally, this method is characterized in the following respect. Namely, the rotation shaft and the output shaft 67, which connect the auxiliary engine and the main motor 1 respectively serving as engine portions, may be considerably offset. In the case of the structure that a final output is provided through a gear, a power transfer mechanism of the composite engine system having a layout being suitable for practical use is provided. The paths among the auxiliary engine, the main motor 1 and the output shaft 67 are summarized below.

1. Connection Path between Auxiliary Engine and Main Motor 1
    In Case of Direct Connection therebetween:
        Directly connected by the clutch 64
    In Case of Connection through Speed Change:
        Gears 71→73→74→72
2. Connection Path between Auxiliary Engine and Output Shaft 67
    In Case of Low Speed: Gears 71→73→75→77
    In Case of High Speed: Gears 71→73→76→78
3. Connection Path between Main Motor 1 and Output Shaft 67
    In Case of Low Speed: Gears 72→74→75→77
    In Case of High Speed: Gears 72→74→76→78

Next, a seventh embodiment of the present invention will be described hereinbelow.

This embodiment is adapted so that the countershaft, which the transmissions provided between the main motor and the auxiliary motor and between the drive shaft and the main motor have in common, is used as the output shaft.

The rotating force generated by the auxiliary engine or the main motor is transmitted to the output shaft through two sets of gears in the sixth embodiment. However, generally, motor vehicles very frequently run at a specific speed change ratio, such as a top gear, as is known by observing the use conditions of the motor vehicles. Although the method of transmitting the rotating force through gears is efficient in comparison with other methods, this efficiency in the former method is not always 100%. Especially, lubricating oil is inevitably deteriorated owing to abrasion and frictional heat on a tooth surface that is subjected to high speed change and high load. The problem of durability arises.

As a method for solving this, it should attempt to directly transmit the rotating force at the frequently used speed change ratio without using the gears as much as possible. In the existing mechanical transmission, the rotating force is usually transmitted from the drive shaft directly to the driven shaft at the top gear without using the gears. Similar concept should be applied to the power transfer mechanism in the composite engine system.

Figure 19:
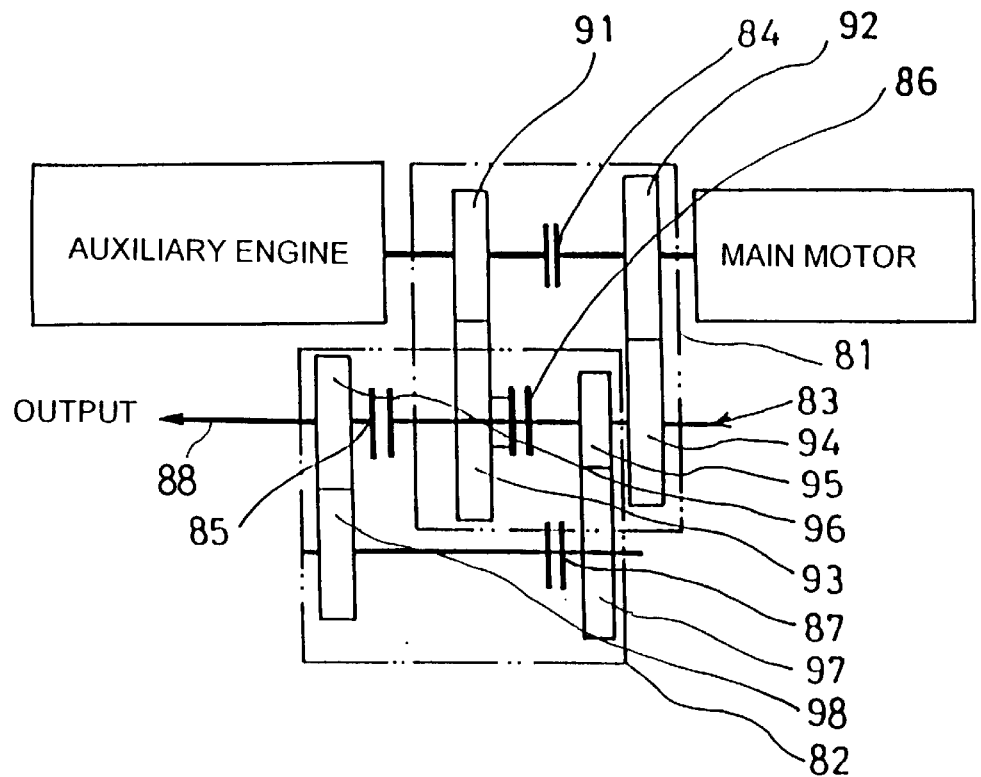
FIG. 19 is a diagram illustrating the constitution of a seventh embodiment of the present invention.

FIG. 19 shows the constitution of the seventh embodiment of the present invention.

As shown in this figure, this power transfer mechanism includes a first transmission 81 and a second transmission 82 that have a countershaft 83 in common.

As illustrated in this figure, a clutch 84 can directly connects the auxiliary engine and the main motor. A clutch 85 controls the transmitting path going from the countershaft 83 to an output shaft 88.

At a gear ratio obtained in a state of engaging both the clutches, the engine and the output shaft are connected with each other by a simple transmitting path.

In the case that the clutch 84 is engaged, the transmitting path between the auxiliary engine and the main motor 1 is a direct connection one.

When the clutch 84 is disengaged, a gear 93 and the countershaft 83 are connected by a selector 86, and the rotating force is transmitted through the path going through gears 91→93→94→92 by being performed a speed change operation. As described hereinabove, there are possible two speed ratios between the auxiliary engine and the main motor 1, namely, the rotating force is transmitted therebetween by the direct connection or at the predetermined speed change ratio.

Next, when the clutch 85 is engaged, the rotating force of the countershaft 83 is directly input. When the clutch 85 is disengaged, the path going through the gears 95→97→9→96 is made by a selector 87 to be effective, thus, the rotating force is output by being performed a speed change operation. Namely, the rotating force of the countershaft 83 can be output directly or through a speed change operation at two speed change ratios.

If both the clutch 84 and the selector 86 are disengaged, the auxiliary engine can be separated from the system and is halted.

This system is characterized in that the rotating force can be output from each of the auxiliary engine and the main motor 1 through one set of the gears when the clutch 85 is engaged. If a speed change ratio used in such a case is assigned to the frequently used speed change ratio, the deterioration of the lubricating oil is prevented. Moreover, the durability and reliability of the apparatus are considerably enhanced. Furthermore, needless to say, energy loss is prevented from occurring when a speed change operation is performed, consequently, an energy-saving running operation can be achieved.

In the ordinary use environments of motor vehicles, the number of frequently used speed change ratios is limited, for instance, a top gear or an overdrive gear. If gear ratios to be used are once set, the gear ratio to be frequently used is naturally determined. Thus, an efficient transmission, by which energy loss due to a speed change operation is small, can be realized by providing an especially simple rotating force transmitting path corresponding to such a gear ratio.

Next, an eighth embodiment of the present invention will be described hereinbelow.

In this embodiment, a transmission is adapted so that an output gear of the auxiliary engine and an output gear of the main motor are placed on a common axis. A rotating force is input through an output gear whose axis of rotation is the common axis, or through a gear engaging with this output gear.

Figure 20:
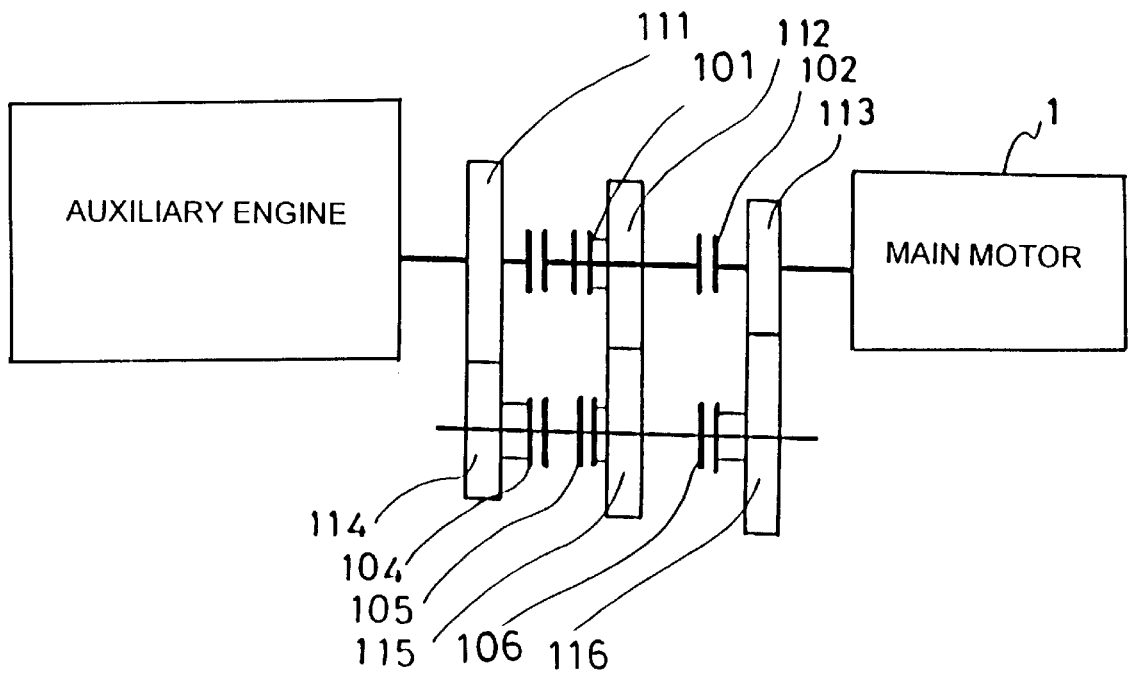
FIG. 20 is a diagram illustrating the constitution of an eighth embodiment of the present invention.

FIG. 20 shows the constitution of the eighth embodiment.

This method provides a structure suitable for outputting a rotating force through a belt, by juxtaposing a sprocket with a gear 112. The purpose of this embodiment is similar to that of the seventh embodiment. Namely, the cost of the apparatus is reduced by decreasing the number of gears to be used. Moreover, the number of speeds is increased. Furthermore, the path leading to the output gear is simplified.

There are the following four possible connection paths between the auxiliary engine and the main motor:

1. Direct connection path through the clutches 101 and 102;
2. Connection path through the speed change comprising the gears 111→114→115→112;
3. Connection path through the speed change comprising the gears 111→114→116→113; and
4. Connection path through the speed change comprising the gears 112→115→116→113.

Further, there are the following three possible connection paths between the main motor 1 and the output gear:

1. Direct connection path through the clutch 102;
2. Connection path through the speed change comprising the gears 113→116→115→112 (output gear); and
3. Connection path through the speed change comprising the gears 113→116→114→111 (output gear).

Comprehensively, in the case of operating both the auxiliary engine and the main motor 1, seven kinds of speed changes can be realized by combining the aforementioned connection paths. Further, the auxiliary engine or the main motor 1 may be separated from the system. In each case of separating one of the auxiliary engine and the main motor 1 from the system and driving the vehicle by using only the other of the auxiliary engine and the main motor 1, a two-speed transmission is realized. Thus, a total of eleven selectable modes of transmitting the rotating force are obtained. Incidentally, note that, although three kinds of the connection paths are combined with four kinds of the connection path, the number of resultant possible speed change ratios is not twelve and only seven speed change ratios are available, for the following reason. Namely, among the connection paths between the auxiliary engine and the main motor 1, the connection path 2 can be established only when the clutch 102 is engaged. Furthermore, among the connection paths between the main motor 1 and the output gear, the connection path 3 can be established only when the clutch 101 is engaged.

Consequently, only 7 possible speed change ratios are obtained (12−2−3=7).

As described above, the number of speeds can be increased by decreasing the number of the gears. Thus, a high-performance system can be realized by simultaneously reducing the cost of the system. Further, if the clutch 101 is engaged by engaging a selector 103, the rotating force of the auxiliary engine is transmitted directly to the gear 112. Thus, energy loss due to the speed change operation is eliminated. Similarly, if the clutch 102 is engaged, the rotating force of the main motor 1 is transmitted to the gear 112 acting as an output gear, without performing a speed change operation.

The output gear is not limited to the gear 112. Similar effects are obtained by using the sprocket juxtaposed with the gear 112 or using another gear directly engaging therewith, for example, the gear 115.

In the case that this apparatus is actually mounted on a motor vehicle as a power transfer unit for a composite engine system, it is usual that the gear 112 and the axles are rather offset. Thus, outputs of the apparatus are taken out therefrom by using a belt. Alternatively, the outputs are extracted by composing a path going from the gear 115 through an idler gear to the differential gear. Incidentally, in this case, it is more desirable to drive the belt.

What we claimed are:

1. A speed change control apparatus for an engine, comprising:

an engine for generating a drive force, constituted by a motor of which rotation speed is controlled by a frequency of A.C. power to be supplied, or a composite engine system including said motor;

a mechanical transmission, which has an input shaft directly connected to an output shaft of said engine, for receiving a driving force and transmitting the driving force through gears to said output shaft rotating at a predetermined rotation speed;

rotation speed detecting means for detecting the rotation speed of said output shaft of said transmission;

engine control means for controlling said engine so that the driving force of said engine is zero when said transmission is shifted to a neutral position by disengaging said gears at a time of speed change operation, and for controlling said engine so that the detected rotation speed of said output shaft is synchronized with the rotation speed of said input shaft when said gears are engaged in the neutral position of said transmission; and speed change control means for controlling said transmission in such a manner as to shift said transmission to the neutral position by disengaging said gears when the driving force of said engine is zero, and for controlling said transmission in such a way as to engage said gears when the rotation speed of said input shaft is nearly synchronized with the rotation speed of said output shaft.

2. A speed change control apparatus according to claim 1, wherein said transmission sets a first speed change ratio based on a highest rotation speed of said output shaft and a highest rotation speed of said engine connected to said input shaft, and in changing the speed from an nth(n≧1) speed change ratio to an (n+1)th speed change ratio when an optimum rotation speed of said engine at the nth speed change ratio has a lowest value, the (n+1)th speed change ratio is serially set so that said engine is driven within a range of the optimum rotation speeds.

3. A speed change control apparatus according to claim 1, wherein said speed change control means engages said gears of said transmission when a difference between circumferential speeds of an output shaft side gear and an input shaft side gear of said gears to be engaged is within a predetermined range.

4. A speed change control apparatus according to claim 1, which further comprises stepping-on amount detecting means for detecting a stepping-on amount of an accelerator pedal, wherein said engine and said transmission are applied to a motor vehicle, and said speed change control means controls said transmission according to the detected rotation speed of said engine and the detected stepping-on amount of said accelerator pedal in such a way as to shift said transmission to the neutral position where said gears are engaged or disengaged.

5. A speed change control apparatus according to claim 4, wherein a speed change ratio of said transmission is selected based on the detected rotation speed of a main motor and a stepping-on amount of an accelerator pedal.

6. A speed change control apparatus according to claim 4, wherein said transmission is provided between said engine and a drive shaft, and an output shaft of said transmission is a drive shaft of a driving wheel.

7. A speed change control apparatus according to claim 4, wherein said engine comprises a main motor for running, and an auxiliary engine for supplementing a driving force of said main motor, said transmission is provided between said main motor and said auxiliary engine, and a motor control means controls said auxiliary engine.

8. A speed change control apparatus according to claim 7, wherein a rotation shaft of said auxiliary engine is placed coaxially with a rotation shaft of said main motor, said transmission comprises a gear connected to said rotation shaft of said auxiliary engine, a gear connected to said rotation shaft of said main motor and a gear meshing with both of said gears respectively connected to said rotation shafts of said auxiliary engine and said main motor, and one of said gears is an output gear.

9. A speed change control apparatus according to claim 4, wherein said engine comprises a main motor for running, and an auxiliary engine for supplementing a driving force of said main motor, a first transmission is provided between said engine and said main motor, a second transmission is provided between said main motor and said drive shaft, said engine control means is adapted to control said main motor and said auxiliary engine, and said speed change control means is adapted to control said first and second transmissions.

10. A speed change control apparatus according to claim 9, wherein at least one of said first and second transmissions comprises:

a speed-changeable epicyclic gear; and a clutch that is adapted to transmit a driving force by engaging two gears.

11. A speed change control apparatus according to claim 9, wherein a rotation shaft of said main motor is placed coaxially with a rotation shaft of said auxiliary engine, said first transmission has a countershaft provided in parallel with said rotation shafts of said main motor and said auxiliary engine, and said second transmission has a rotation shaft placed in parallel with said countershaft, so that said first and second transmissions have said countershaft in common.

12. A speed change control apparatus according to claim 11, wherein said first and second transmissions are adapted to use said countershaft as an output shaft.

13. A speed change control apparatus according to claim 7, wherein said main motor is an synchronous motor.

14. A speed change control apparatus according to claim 7, wherein said main motor is an induction motor.

15. A speed change control apparatus according to claim 7, wherein said auxiliary engine is an internal combustion engine.

16. A speed change control apparatus according to claim 7, wherein said auxiliary engine comprises an internal combustion engine and a control motor for controlling a rotation speed of said internal combustion engine.

17. A speed change control apparatus according to claim 16, wherein when said gears of said transmission are disengaged and said transmission is shifted to the neutral position, said engine control means drives said control motor as a self-starting motor, if starting said internal combustion engine, and operates said control motor as a generator, if the internal combustion engine is operated.

18. A speed change control apparatus according to claim 16, wherein, when said gears of said transmission are engaged, said engine control means causes said control motor to operate as a generator, if electric power is needed, and drives said control motor to operate as a motor, if electric power is unnecessary.

19. A speed change control apparatus according to claim 7, which further comprises a lubricating oil pump that is driven by the main motor.

* * * * *